United States Patent
Achiwa

(10) Patent No.: US 12,412,409 B2
(45) Date of Patent: Sep. 9, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Ken Achiwa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 462 days.

(21) Appl. No.: 17/940,127

(22) Filed: Sep. 8, 2022

(65) Prior Publication Data

US 2023/0077608 A1 Mar. 16, 2023

(30) Foreign Application Priority Data

Sep. 13, 2021 (JP) .................................. 2021-148491

(51) Int. Cl.
*G06V 30/413* (2022.01)
*G06V 10/70* (2022.01)
*G06V 30/18* (2022.01)
*G06V 30/19* (2022.01)

(52) U.S. Cl.
CPC ........ *G06V 30/18019* (2022.01); *G06V 10/70* (2022.01); *G06V 30/19093* (2022.01); *G06V 30/413* (2022.01)

(58) Field of Classification Search
CPC ............. G06V 30/18019; G06V 10/70; G06V 30/19093; G06V 30/413
See application file for complete search history.

(56) References Cited

U.S. PATENT DOCUMENTS

| | | | |
|---|---|---|---|
| 7,185,008 B2* | 2/2007 | Kawatani .............. | G06F 16/353 707/999.005 |
| 8,463,738 B2* | 6/2013 | Mizuguchi .......... | G06F 16/3331 707/602 |
| 9,552,516 B2* | 1/2017 | Janssen, Jr. ........... | G06V 40/211 |
| 2019/0065991 A1* | 2/2019 | Guggilla ................ | G06N 20/00 |
| 2019/0272444 A1* | 9/2019 | Misawa ................ | G06V 30/416 |
| 2021/0216765 A1* | 7/2021 | Xu ........................ | G06F 16/953 |
| 2023/0065915 A1* | 3/2023 | Berestovsky ...... | G06V 30/1448 |

FOREIGN PATENT DOCUMENTS

JP 2016051339 A 4/2016

* cited by examiner

*Primary Examiner* — Gregory A Morse
*Assistant Examiner* — Renae A Bitor
(74) *Attorney, Agent, or Firm* — ROSSI, KIMMS & McDOWELL LLP

(57) ABSTRACT

Provided is an information processing apparatus that extracts one or more candidate character strings to be a candidate of an item value corresponding to a predetermined item, from among multiple character strings included in a document image to be processed. The information processing apparatus first obtains information indicating an attribute group of a preset extraction target, then identifies an attribute group to which each of the multiple character strings belongs from among predetermined multiple attribute groups based on a feature vector corresponding to each of the multiple character strings included in the document image to be processed, and subsequently extracts the character string whose identified attribute group is the same as the attribute group of the extraction target from among the multiple character strings included in the document image to be processed, as the candidate character string.

17 Claims, 22 Drawing Sheets

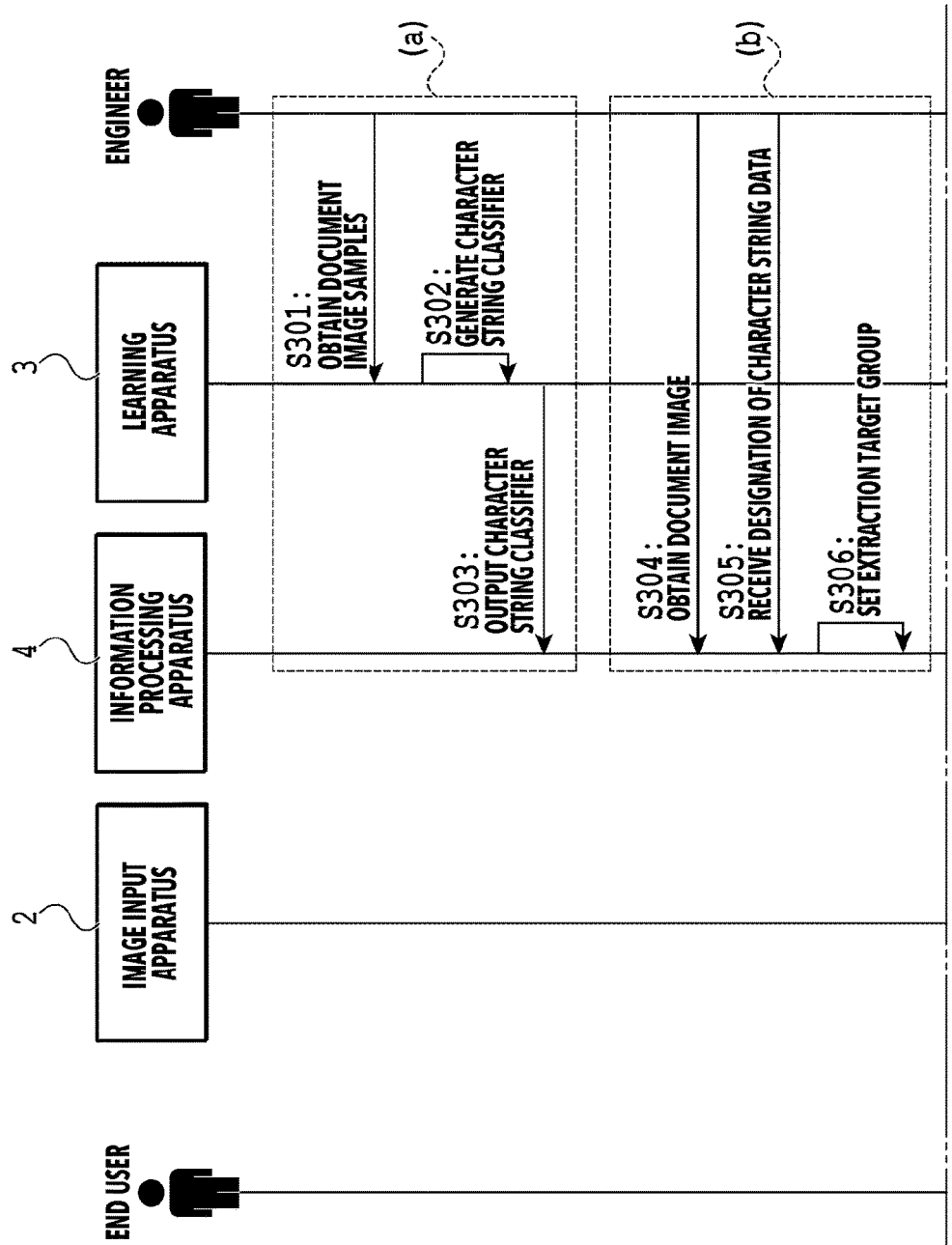

| ATTRIBUTE GROUP | PERSONAL NAME (1001) | ADDRESS (1002) | OCCUPATION (1003) | RELATIONSHIP (1004) | DATE (1005) | DISEASE NAME (1006) |
|---|---|---|---|---|---|---|
| SAMPLES OF CHARACTER STRING DATA | YUKAWA AIRI | X-X-X, OHMINE, AKIRUNO-SHI, TOKYO | POLICE OFFICER | FATHER | 1986/9/21 | UTERINE CERVICAL CANCER |
| | IRIE SHOKICHI | Y-YY-Y, NAKAZOE-CHO, KAWACHINO-SHI, OSAKA | FIREFIGHTER | MOTHER | 2020.1.19 | SJOGREN SYNDROME |
| | OKA YUKINO | Z-ZZ-ZZ, KAMII, ASUKA-MURA, TAKAICHI-GUN, NARA | PHYSICIAN | WIFE | MARCH 22, 1998 | LASSA FEVER |
| | TSURUOKA NAO | XY-XYZ, CHABATAKE-CHO, SUGA-SHI, FUKUSHIMA | PROFESSOR | HUSBAND | AUGUST 8, REIWA 2 | SYMPTOMATIC MENTAL DISORDER |
| | SAKANO TAKEHISA | XX-YY-Z-XYZ, EIFUKUJI-CHO, KOUCHI-SHI | CARPENTER | OFFSPRING | 2018-12-23 | HAND-FOOT-AND -MOUTH DISEASE |
| | HAMADA MORIHIKO | XY-ZZ, AOI-CHO, OBAMA-SHI, FUKUI | REPORTER | ELDER BROTHER | FEBRUARY 1, HEISEI 30 | BARTHOLIN'S CYST |
| | HAMA HISAKO | X-Y-X, SEKIMOTONAKA, SEKIMOTO-CHO, MINAMIIBARAKI-SHI | ENGINEER | ELDER SISTER | 2019.04.25 | PUFFERFISH POISONING |
| | ... | | ... | | | |

FIG.10

INFORMATION PROCESSING APPARATUS, INFORMATION PROCESSING METHOD, AND STORAGE MEDIUM

BACKGROUND

Field

The present disclosure relates to a technique of extracting data of a character string from a document image.

Description of the Related Art

There is performed an operation of extracting a predetermined item value as data of a character string from a document image obtained by using an image scanner device (hereinafter, referred to as "scanner"), a facsimile (hereinafter, referred to as "FAX") receiver, or the like. The extracted data of character string is used in a data input task or the like, as input data for a process of transcription to a business system, a document filing process such as automatic file name appending, or the like.

As a technique of assisting the data input task, Japanese Patent Laid-Open No. 2016-051339 discloses a method of extracting a character string corresponding to an item value from an image of a document that is generally referred to as a semi-fixed form document or a non-fixed form document and that is created in a layout different from that of a fixed form document whose layout is defined in advance. In the method (hereinafter, referred to as "conventional method") disclosed in Japanese Patent Laid-Open No. 2016-051339, first, a predetermined item name such as "account number" and an item value such as "1234567" corresponding to the item name are extracted from multiple character strings included in a document image of a transfer request form or the like. Next, validity of the item name and the item value is evaluated from a positional relationship between the item name and the item value and the item value is extracted based on a result of this evaluation. In the conventional method, the item name is extracted based on a predetermined keyword such as "number" or "account number" and the item value is extracted based on a predetermined data type such as " " (N is, for example, an arbitrary Arabic numeral).

Although the conventional method can extract an item value of an item that is noted by a regular character string such as "money amount", "date", or "money amount", the conventional method sometimes cannot extract an item value of an item that is noted by an irregular character string such as "personal name", "address", "occupation", or "relationship". Specifically, in the case where an item value is noted by a regular character string, validity can be evaluated by using a data type. However, in the case where an item value is noted by an irregular character string, evaluation of validity using a data type is difficult and a desired item value cannot be always extracted.

SUMMARY

An information processing apparatus of the present disclosure is an information processing apparatus that extracts one or more candidate character strings to be a candidate of an item value corresponding to a predetermined item, from among a plurality of character strings included in a document image to be processed. Here, The information processing apparatus includes one or more hardware processors; and one or more memories storing one or more programs configured to be executed by the one or more hardware processors, the one or more programs including instructions for: obtaining information on an attribute group of a preset extraction target among a predetermined plurality of attribute groups; identifying the attribute group to which each of the plurality of character strings belongs from among the plurality of attribute groups based on a feature vector corresponding to each of the plurality of character strings, and extracting the character string whose identified attribute group is the same as the attribute group of the extraction target from among the plurality of character strings as the candidate character string, and outputting the extracted candidate character string.

Further features of the present invention will become apparent from the following description of exemplary embodiments with reference to the attached drawings.

BRIEF DESCRIPTION OF THE DRAWINGS

FIG. 2A-1 is a block diagram illustrating an example of functional blocks included in an image input apparatus according to the first embodiment and FIG. 2A-2 is a block diagram illustrating an example of hardware included in the image input apparatus according to the first embodiment;

FIG. 2B-1 is a block diagram illustrating an example of functional blocks included in a learning apparatus according to the first embodiment and FIG. 2B-2 is a block diagram illustrating an example of hardware included in the learning apparatus according to the first embodiment;

FIG. 2C-1 is a block diagram illustrating an example of functional blocks included in an information processing apparatus according to the first embodiment and FIG. 2C-2 is a block diagram illustrating an example of hardware included in the information processing apparatus according to the first embodiment;

FIGS. 3A and 3B are sequence diagrams illustrating an example of a processing sequence of the information processing system according to the first embodiment;

FIG. 10 is an explanatory view for explaining examples of attribute groups and character string data;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<Information Processing System>

Figure 1:
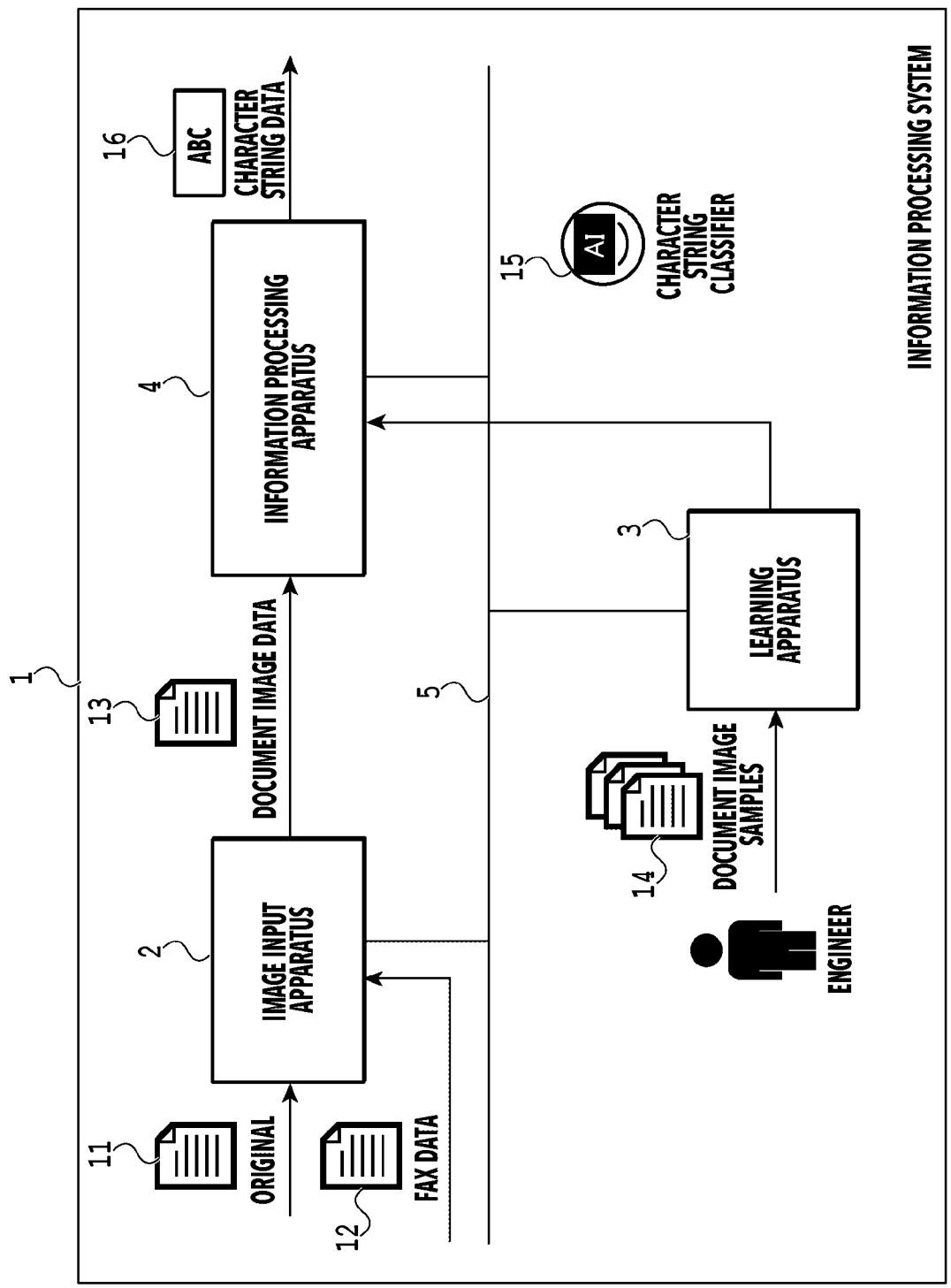
FIG. 1 is a block diagram illustrating an example of a configuration of an information processing system according to a first embodiment.

An information processing system 1 according to a first embodiment is described with reference to FIGS. 1 to 7 and FIGS. 10 to 13B. FIG. 1 is a block diagram illustrating an example of a configuration of the information processing system 1 according to the first embodiment. The information processing system 1 includes an image input apparatus 2, a learning apparatus 3, and an information processing apparatus 4. Moreover, the image input apparatus 2, the learning apparatus 3, and the information processing apparatus 4 are coupled to be capable of communicating with one another via a network 5. In the information processing system 1, not one but multiple image input apparatuses 2, multiple learning apparatuses 3, or multiple information processing apparatuses 4 may be coupled to the network 5. Specifically, for example, the configuration may be such that the information processing apparatus 4 is formed of a first apparatus that has high-speed computation resources and a second apparatus that has a high-capacity storage and the first and second apparatuses are coupled to be capable of communicating with each other via the network 5. The information processing system 1 illustrated in FIG. 1 is a system in which one image input apparatus 2, one learning apparatus 3, and one information processing apparatus 4 are coupled to the network 5 as an example.

The image input apparatus 2 is achieved by, for example, a multi-function peripheral (MFP) having multiple functions such as a print function, a scan function, and a FAX function. The image input apparatus 2 has a function of obtaining an image and outputting data of the obtained image to an external apparatus. In the case where the image input apparatus 2 is achieved by the MFP, for example, the image input apparatus 2 obtains a document image 13 by optically scanning an original 11 printed on a printing medium such as paper by using the scan function and performing a well-known scan image process. Moreover, in this case, for example, the image input apparatus 2 obtains the document image 13 by receiving FAX data 12 transmitted from a FAX transmitter not illustrated in FIG. 1 by using the FAX function and performing a well-known FAX image process on the FAX data 12. Furthermore, the image input apparatus 2 transmits the obtained document image 13 to the information processing apparatus 4 as document image data.

Note that the MFP is merely an example and the image input apparatus 2 may be achieved by a personal computer (PC) or the like. Specifically, for example, the image input apparatus 2 may obtain the document image 13 generated by using a document creation application operating in a PC used as the image input apparatus 2 and transmit the obtained document image 13 to the information processing apparatus 4 as the document image data. In this case, the data of the document image 13 generated by using the document creation application is, for example, data in an electronic document file format such as a Portable Document Format (PDF). This data may be data such as still image data of Joint Photographic Experts Group (JPEG) or the like.

The learning apparatus 3 performs machine learning and generates a character string classifier 15 based on a learned model obtained by performing the machine learning. In this case, the character string classifier 15 generated by the learning apparatus 3 is a classifier for identifying a group of an attribute (hereinafter, referred to as "attribute group") to which a character string inputted as an explanatory variable belongs, from among predetermined multiple attribute groups, based on information indicating the character string. Specifically, the learning apparatus 3 first obtains data of character strings (hereinafter, referred to as "character string data") included in multiple samples of document images (hereinafter, referred to as "document image samples 14") provided by a user such as an engineer. Next, the learning apparatus 3 generates the character string classifier 15 based on a learned model obtained by performing machine learning while using the obtained character string data as data for learning. In this case, the attribute group refers to a group capturing conceptual features of the character string data generally referred to as named entity and examples thereof include proper nouns such as personal names and names of places and named entities such as date and amount of money. Note that the learning apparatus 3 may convert the obtained character string data to a feature vector and perform the machine learning by using the converted feature vector as the data for learning. The feature vector is to be described later.

The attribute group and the character string data are described with reference to FIG. 10. FIG. 10 is an explanatory view for explaining examples of the attribute groups and the character string data according to the first embodiment. FIG. 10 illustrates specific examples of pieces of character string data to be classified into attribute groups of personal name 1001, address 1002, occupation 1003, relationship 1004, date 1005, and disease name 1006 that are specific examples of attribute groups. FIG. 10 includes an item value for which a data type can be defined such as the item value of the date 1005 and item values formed of character strings with different character appearances such as the item values of the personal name 1001, the address 1002, the occupation 1003, the relationship 1004, and the disease name 1006.

The learning apparatus 3 obtains, for example, multiple pieces of data of document images handled in a human resource back office, as the document image samples 14. The learning apparatus 3 groups character strings included in each of the obtained multiple document image samples 14 into multiple attribute groups corresponding to document name, date, personal name, address, occupation, relationship, and the like by performing machine learning, based on data of the character strings. The learning apparatus 3 thereby generates the character string classifier 15 for identifying an attribute group to which a character string inputted as an explanatory variable belongs among the aforementioned attribute groups based on data indicating the character string. Note that the character strings included in the document image samples 14 are obtained as a character recognition result acquired by executing an optical character recognition (OCR) process on the document image samples 14.

Moreover, the learning apparatus 3 may obtain, for example, multiple pieces of data of document images handled in a medical back office, as the document image samples 14. In this case, the learning apparatus 3 groups character strings included in each of the obtained multiple document image samples 14 into multiple attribute groups corresponding to document name, date, personal name, medical institution name, disease name, medicine name, amount of money, and the like by performing machine learning, based on data of the character strings. The learning apparatus 3 thereby generates the character string classifier 15 for identifying which one of the aforementioned attribute groups an inputted character string belongs to, based on data indicating the inputted character string. After the generation of the character string classifier 15, the learning apparatus 3 transmits the generated character string classifier 15 to the information processing apparatus 4 via the network 5. Details of the learning apparatus 3 are described later.

The information processing apparatus 4 obtains one or more pieces of data corresponding respectively to character strings included in the document image 13 received from the image input apparatus 2, as the character string data of each character string. Specifically, for example, the information processing apparatus 4 obtains the character recognition result acquired by executing the OCR process on the document image 13 as the character string data. Moreover, the information processing apparatus 4 extracts one or more pieces of data of character strings to be a candidate (hereinafter, referred to as "candidate character strings") from among the one or more pieces of data of character strings included in the document image 13. Specifically, the information processing apparatus 4 first uses the character string classifier 15 to identify which one of the multiple attribute groups the character string of each piece of obtained character string data belongs to. Next, the information processing apparatus 4 extracts character string data 16 whose identified attribute group is the same as an attribute group of a predetermined extraction target (hereinafter, referred to as "extraction target group"), from among the one or more pieces of data of character strings included in the document image 13, as data of the candidate character string. The information processing apparatus 4 outputs the extracted data of candidate character string (character string data 16). Specifically, the information processing apparatus 4 outputs the extracted data of candidate character string (character string data 16) to a storage device, a display device, or the like not illustrated in FIG. 1. Details of the information processing apparatus 4 are described later.

The network 5 is a communication network formed of a local area network (LAN), a wide area network (WAN), or the like. The network 5 couples the image input apparatus 2, the learning apparatus 3, and the information processing apparatus 4 to allow communication among these apparatuses and enables exchange of data among these apparatuses.

<Apparatus Configurations>

Figures 1, 2A:
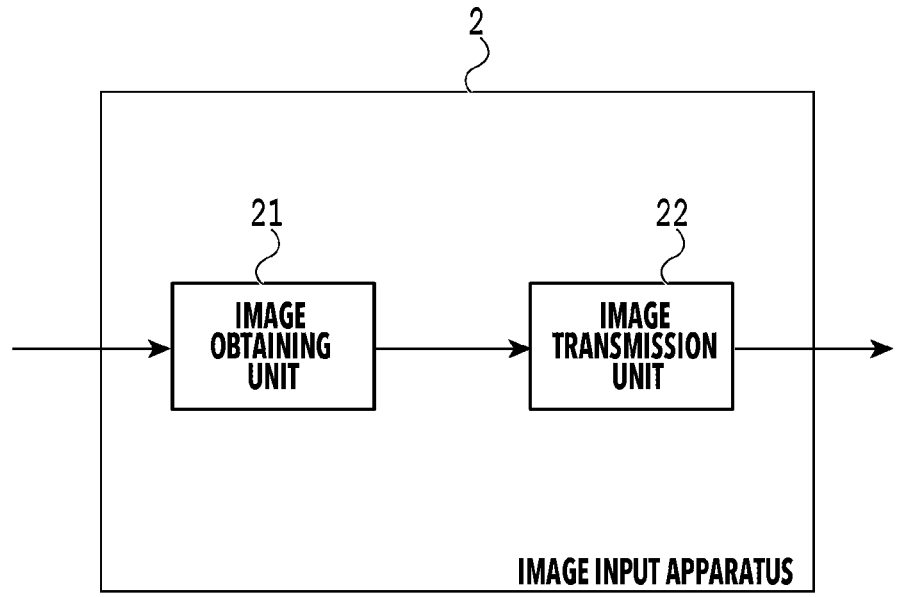
Figures 2, 2A:
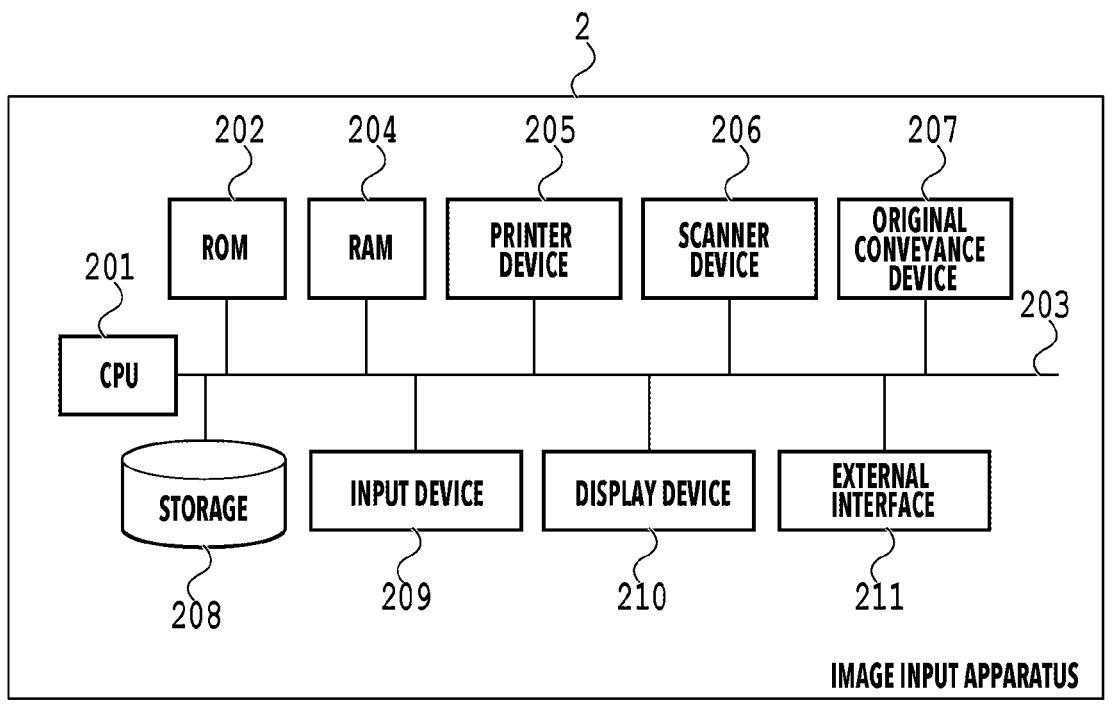

Configurations of the image input apparatus 2, the learning apparatus 3, and the information processing apparatus 4 are described with reference to FIGS. 2A-1 to 2C-2. FIGS. 2A-1 and 2A-2 are block diagrams illustrating an example of a configuration of the image input apparatus 2 according to the first embodiment. Specifically, FIG. 2A-1 is a block diagram illustrating an example of functional blocks included in the image input apparatus 2 according to the first embodiment. The image input apparatus 2 includes an image obtaining unit 21 and an image transmission unit 22. The image obtaining unit 21 obtains the document image 13. The image transmission unit 22 transmits the data of the document image 13 obtained by the image obtaining unit 21 to the information processing apparatus 4 via the network 5.

Processes of the units configured to function in the image input apparatus 2 are performed by hardware such as an application specific integrated circuit (ASIC) incorporated in the image input apparatus 2. These processes may be performed by hardware such as a field programmable gate array (FPGA). Moreover, these processes may be performed by software using a memory such as a random access memory (RAM) and a processor such as a central processing unit (CPU).

FIG. 2A-2 is a block diagram illustrating an example of hardware included in the image input apparatus 2 according to the first embodiment. Specifically, the block diagram illustrated in FIG. 2A-2 illustrates an example of a hardware configuration of the image input apparatus 2 in the case where the units configured to function in the image input apparatus 2 operate as software. The image input apparatus 2 is formed of a computer and the computer includes a CPU 201, a ROM 202, a data bus 203, a RAM 204, a printer device 205, and a scanner device 206 as illustrated as an example in FIG. 2A-2. The computer also includes an original conveyance device 207, a storage 208, an input device 209, a display device 210, and an external interface 211 as illustrated as an example in FIG. 2A-2.

The CPU 201 is a processor for controlling entire operations in the image input apparatus 2. The CPU 201 executes a start-up program stored in the ROM 202 or the like to start a system of the image input apparatus 2. Moreover, the CPU 201 executes a control program stored in the storage 208 or the like to cause each of the units configured to function as the print function, the scan function, the FAX function, and the like in the image input apparatus 2 to function. Note that the configuration may be such that the image input apparatus 2 includes one or multiple pieces of dedicated hardware other than the CPU 201 and the dedicated hardware at least partially executes the processes of the CPU 201. Examples of the dedicated hardware include an ASIC, a FPGA, a digital signal processor (DSP), and the like.

The ROM 202 is a non-volatile memory configured to store programs and the like that do not have to be changed, and stores, for example, the start-up program for start-up of the image input apparatus 2. The data bus 203 couples the pieces of hardware included in the image input apparatus 2 to enable data transmission among the pieces of hardware. The RAM 204 is a volatile memory that temporarily stores a program or data supplied from the ROM 202, the storage 208, or the like or data or the like supplied from the outside via the external interface 211. The RAM 204 is used as a work memory in the case where the CPU 201 executes programs such as the start-up program and the control program.

The printer device 205 is a device for image output and is a device for performing print output by printing a document image obtained in the image input apparatus 2 onto a printing medium such as paper. The scanner device 206 is a device for image input and is a device for optically scanning a printing medium such as a paper on which characters, figures, and the like are printed and obtaining the characters, figures, and the like as the document image. The original conveyance device 207 is a device for detecting originals placed on an original stand not illustrated in FIG. 2A-2 and conveying the detected originals one by one to the scanner device 206. The original conveyance device 207 is achieved by an auto document feeder (ADF) or the like.

The storage 208 is achieved by a hard disk drive (HDD) or the like and is an auxiliary storage device for storing the aforementioned control program or the document image data. The input device 209 is achieved by a touch panel, a hard key, or the like and is a device for receiving operation inputs on the image input apparatus 2 from a user. The display device 210 is achieved by a liquid crystal display or the like and is a device for performing display output such that the user can view display images such as a setting screen outputted by the image input apparatus 2. The external interface 211 couples the image input apparatus 2 and the network 5 to each other and is an interface that receives the FAX data 12 from a FAX transmitter not illustrated in FIG. 2A-2 and that transmits the data of document image to the information processing apparatus 4.

Figures 1, 2B:
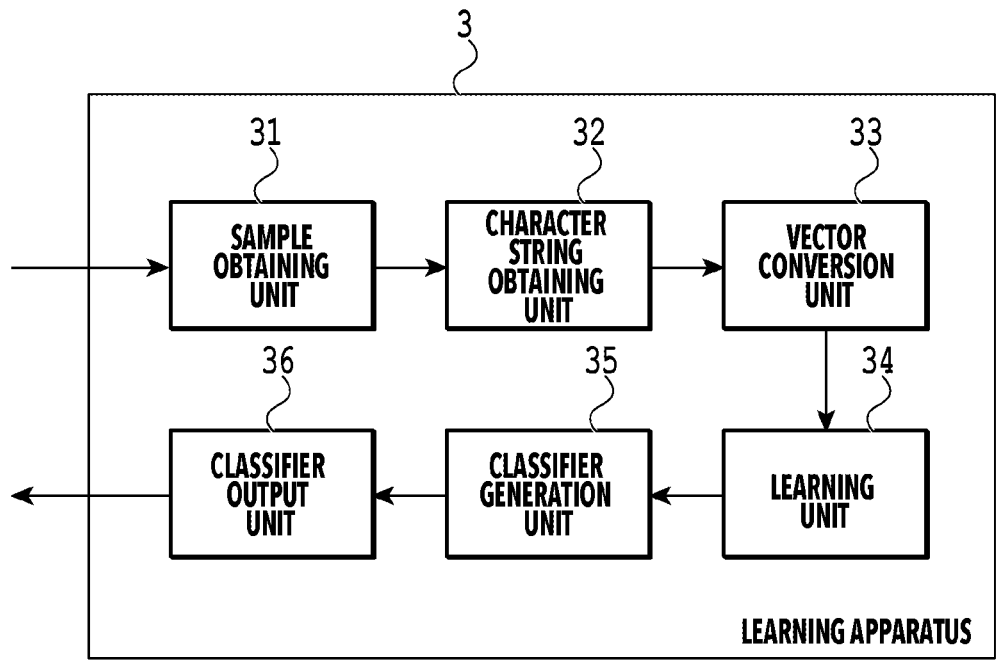
Figures 2, 2B:
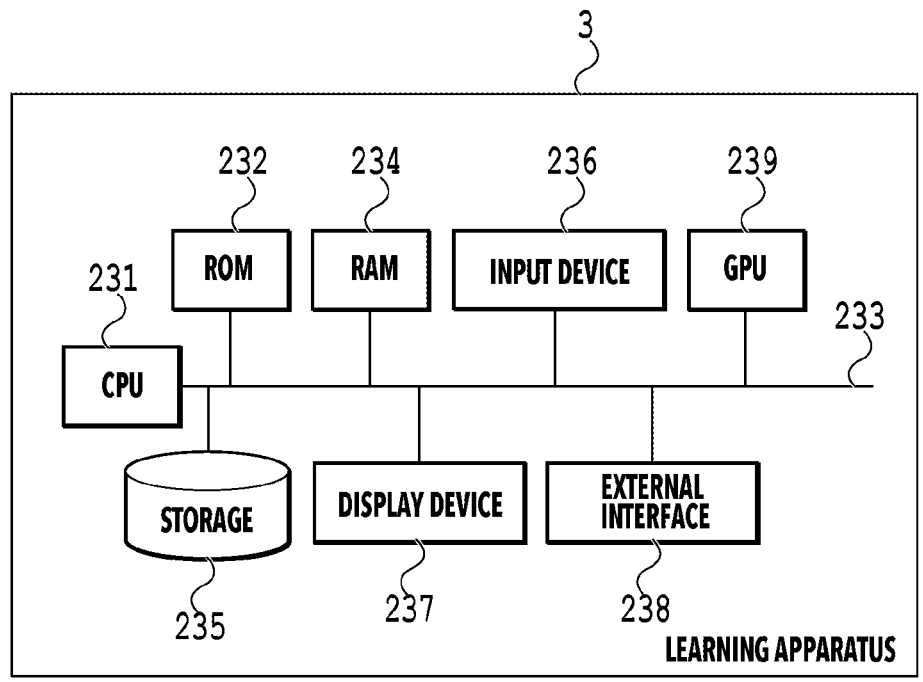

FIGS. 2B-1 and 2B-2 are block diagrams illustrating an example of a configuration of the learning apparatus 3 according to the first embodiment. Specifically, FIG. 2B-1 is a block diagram illustrating an example of functional blocks included in the learning apparatus 3 according to the first embodiment. The learning apparatus 3 includes a sample obtaining unit 31, a character string obtaining unit 32, a vector conversion unit 33, a learning unit 34, a classifier generation unit 35, and a classifier output unit 36.

The sample obtaining unit 31 obtains the document image samples 14. Specifically, for example, the sample obtaining unit 31 obtains the document image samples 14 corresponding to an operation input by the user by reading the document image samples 14 from a storage device not illustrated in FIG. 2B-1 based on the operation input. The character string obtaining unit 32 obtains one or more pieces of data of character strings that are included in document images illustrated in the document image samples 14 obtained by the sample obtaining unit 31. The vector conversion unit 33 converts each of the one or more pieces of character string data obtained by the character string obtaining unit 32 to a feature vector for each piece of character string data. The learning unit 34 performs machine learning of a learning model by inputting the feature vector converted by the vector conversion unit 33 into the learning model as data for learning. The classifier generation unit 35 receives the learned model that is the result of learning by the learning unit 34 and generates the character string classifier 15 based on the learned model. Note that the classifier generation unit 35 may set the learned model that is the result of learning by the learning unit 34 as the character string classifier 15 without performing a process on the learned model. The classifier output unit 36 outputs the character classifier generated by the classifier generation unit 35 to the information processing apparatus 4 or a storage device not illustrated in FIG. 2B-2. Detailed processes of the units included in the learning apparatus 3 are described later.

The processes of the units configured to function in the learning apparatus 3 are performed by hardware such as an ASIC or FPGA incorporated in the learning apparatus 3 or software using a memory such as a RAM and a processor such as a CPU. FIG. 2B-2 is a block diagram illustrating an example of hardware included in the learning apparatus 3 according to the first embodiment. Specifically, the block diagram illustrated in FIG. 2B-2 illustrates an example of a hardware configuration of the learning apparatus 3 in the case where the units configured to function in the learning apparatus 3 operate as software. The learning apparatus 3 is formed of a computer and the computer includes a CPU 231, a ROM 232, a data bus 233, a RAM 234, a storage 235, an input device 236, and a display device 237 as illustrates as an example in FIG. 2B-2. The computer also includes an external interface 238 and a GPU 239 as illustrated as an example in FIG. 2B-2.

The CPU 231 is a processor for controlling entire operations in the learning apparatus 3. The CPU 231 executes a start-up program stored in the ROM 232 or the like to start a system of the learning apparatus 3. Moreover, the CPU 231 executes a control program stored in the storage 235 to cause each unit configured to function in the learning apparatus 3 to function. Note that the configuration may be such that the learning apparatus 3 includes one or multiple pieces of dedicated hardware other than the CPU 231 and the dedicated hardware at least partially executes the processes of the CPU 231. Examples of the dedicated hardware include an ASIC, a FPGA, a DSP, and the like.

The ROM 232 is a non-volatile memory configured to store programs and the like that do not have to be changed, and stores, for example, the start-up program for start-up of the learning apparatus 3. The data bus 233 couples the pieces of hardware included in the learning apparatus 3 to transmit data among the pieces of hardware. The RAM 234 is a volatile memory that temporarily stores a program or data supplied from the ROM 232, the storage 235, or the like or data or the like supplied from the outside via the external interface 238. The RAM 234 is used as a work memory in the case where the CPU 231 executes programs such as the start-up program and the control program. The storage 235 is achieved by an HDD or the like and is an auxiliary storage device for storing the aforementioned control program, the document image sample data 14, or the like.

The input device 236 is achieved by a mouse, a keyboard, or the like and is a device for receiving operation inputs on the learning apparatus 3 from a user such as an engineer (hereinafter, simply referred to as "engineer"). The display device 237 is achieved by a liquid crystal display or the like and is a device for performing display output such that the engineer can view display images such as a setting screen of the learning apparatus 3. The external interface 238 couples the learning apparatus 3 and the network 5 to each other and is an interface for receiving the document image samples 14 from a storage device not illustrated in FIG. 2B-2 or an external apparatus such as a PC. Moreover, the external interface 238 is an interface for outputting the character string classifier 15 to the information processing apparatus 4 or a storage device not illustrated in FIG. 2B-2. The GPU 239 is a processor capable of performing image processes. The GPU 239 performs, for example, computation for generating the character string classifier 15 according to a control command received from the CPU 231, based on data of character strings included in the received document images.

Figures 1, 2C:
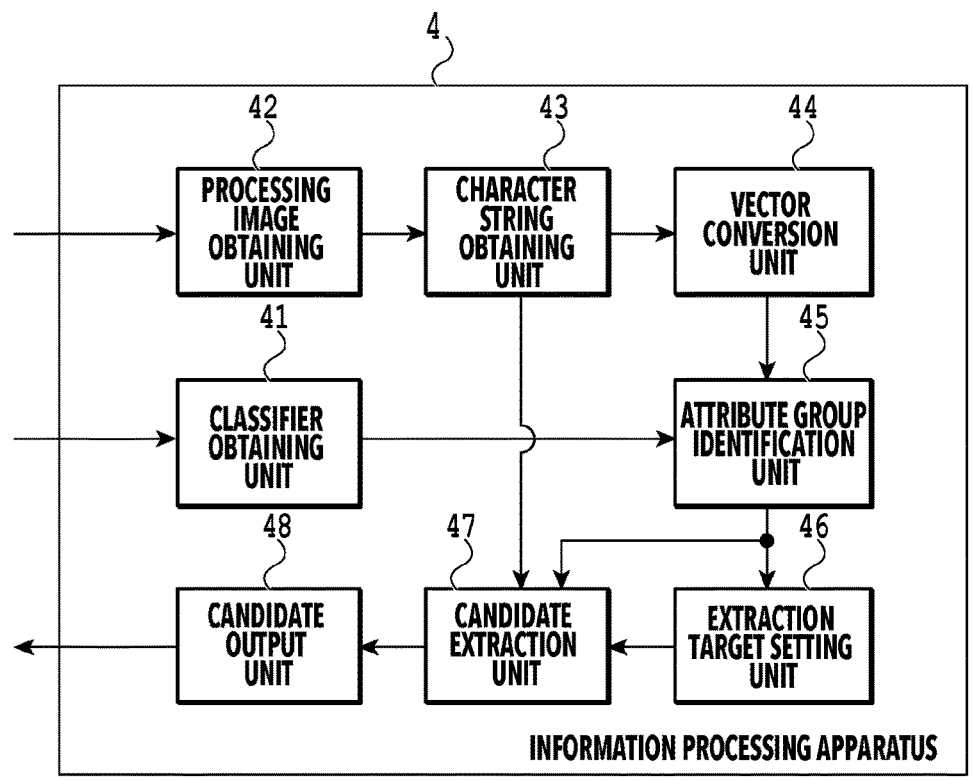
Figures 2, 2C:
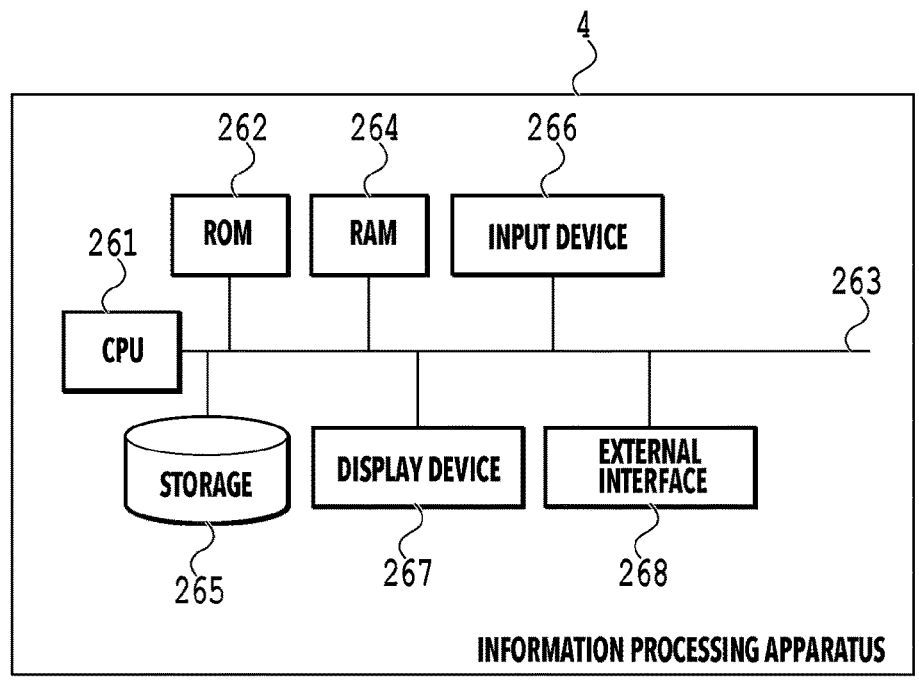

FIGS. 2C-1 and 2C-2 are block diagrams illustrating an example of a configuration of the information processing apparatus 4 according to the first embodiment. Specifically, FIG. 2C-1 is a block diagram illustrating an example of functional blocks included in the information processing apparatus 4 according to the first embodiment. The information processing apparatus 4 includes a classifier obtaining unit 41, a processing image obtaining unit 42, a character string obtaining unit 43, a vector conversion unit 44, an attribute group identification unit 45, an extraction target setting unit 46, a candidate extraction unit 47, and a candidate output unit 48.

The classifier obtaining unit 41 obtains the character string classifier 15. Specifically, for example, the classifier obtaining unit 41 obtains the character string classifier 15 by receiving the character string classifier 15 outputted by the learning apparatus 3. The classifier obtaining unit 41 may obtain the character string classifier 15 stored in advance in a storage device not illustrated in FIG. 2C-1 by reading the character string classifier 15 from the storage device. The processing image obtaining unit 42 obtains the document image 13. Specifically, for example, the processing image obtaining unit 42 obtains the document image 13 by receiving data of the document image 13 transmitted by the image input apparatus 2. The processing image obtaining unit 42 may obtain the document image 13 stored in advance in a storage device not illustrated in FIG. 2C-1 by reading the data of the document image 13 from the storage device. The character string obtaining unit 43 obtains one or more pieces of data of character strings included in the document image 13. The vector conversion unit 44 converts each of the one or more pieces of the character string data obtained by the character string obtaining unit 43 to a feature vector for each piece of character string data.

The attribute group identification unit 45 identifies an attribute group to which the character string corresponding to each feature vector converted by the vector conversion unit 44 belongs, from among predetermined multiple attribute groups, based on the feature vector. Specifically, the attribute group identification unit 45 inputs the feature vector converted by the vector conversion unit 44 into the character string classifier 15 obtained by the classifier obtaining unit 41 as the explanatory variable. The attribute group identification unit 45 obtains information (hereinafter, referred to as "group identification (ID)") on an identification number or the like that is outputted as an inference result by the character string classifier 15 and by which the attribute group can be identified. The attribute group to which the character string corresponding to the feature vector belongs is identified by using the group ID.

The extraction target setting unit 46 sets the attribute group identified by the attribute group identification unit 45 as an extraction target group. The extraction target setting unit 46 outputs information indicating the extraction target group as extraction target group information. Specifically, the extraction target setting unit 46 outputs the extraction target group information to a storage device such as a storage 265 and stores the extraction target group information therein.

The candidate extraction unit 47 selects and extracts a candidate character string from among the one or more pieces of character string data obtained by the character string obtaining unit 43 and included in the document image 13, based on the extraction target group. Specifically, for example, the candidate extraction unit 47 first obtains the extraction target group information stored in advance in a storage device not illustrated in FIG. 2C-1 by reading the extraction target group information from the storage device. Next, the candidate extraction unit 47 compares the extraction target group indicated by the extraction target group information and the attribute group identified by the attribute group identification unit 45 for each character string included in the document image 13. The candidate extraction unit 47 extracts the data of the candidate character string based on a result of this comparison. The candidate output unit 48 outputs the character string data 16 extracted by the candidate extraction unit 47 as the data of the candidate character string. Specifically, for example, the candidate output unit 48 outputs and displays the character string data 16 on a display device not illustrated in FIG. 2C-1. Detailed processes of the units included in the information processing apparatus 4 are described later.

The processes of the units configured to function in the information processing apparatus 4 are performed by hardware such as an ASIC or FPGA incorporated in the information processing apparatus 4 or software using a memory such as a RAM and a processor such as a CPU. FIG. 2C-2 is a block diagram illustrating an example of hardware included in the information processing apparatus 4 according to the first embodiment. Specifically, the block diagram illustrated in FIG. 2C-2 illustrates an example of a hardware configuration of the information processing apparatus 4 in the case where the units configured to function in the information processing apparatus 4 operate as software. The information processing apparatus 4 is formed of a computer and the computer includes a CPU 261, a ROM 262, a data bus 263, a RAM 264, and the storage 265 as illustrated as an example in FIG. 2C-2. The computer also includes an input device 266, a display device 267, and an external interface 268 as illustrated as an example in FIG. 2C-2.

The CPU 261 is a processor for controlling entire operations in the information processing apparatus 4. The CPU 261 executes a start-up program stored in the ROM 262 or the like to start a system of the information processing apparatus 4. Moreover, the CPU 261 executes a control program stored in the storage 265 to cause each unit configured to function in the information processing apparatus 4 to function. Note that the configuration may be such that the information processing apparatus 4 includes one or multiple pieces of dedicated hardware other than the CPU 261 and the dedicated hardware at least partially executes the processes of the CPU 261. Examples of the dedicated hardware include an ASIC, a FPGA, a DSP, and the like.

The ROM 262 is a non-volatile memory configured to store programs and the like that do not have to be changed, and stores, for example, the start-up program for start-up of the information processing apparatus 4. The data bus 263 couples the pieces of hardware included in the information processing apparatus 4 to transmit data among the pieces of hardware. The RAM 264 is a volatile memory that temporarily stores a program or data supplied from the ROM 262, the storage 265, or the like or data or the like supplied from the outside via the external interface 268. The RAM 264 is used as a work memory in the case where the CPU 261 executes programs such as the start-up program and the control program. The storage 265 is achieved by an HDD or the like and is an auxiliary storage device for storing the aforementioned control program, the data of the document image 13, the character string classifier 15, the character string data 16, or the like.

The input device 266 is achieved by a mouse, a keyboard, or the like and is a device for receiving operation inputs on the information processing apparatus 4 from a user such as the engineer or an end user. The display device 267 is achieved by a liquid crystal display or the like and is a device for performing display output such that a user such as the engineer or the end user can view display images such as a setting screen of the information processing apparatus 4. The external interface 268 couples the information processing apparatus 4 and the network 5 to each other and is an interface for receiving the character string classifier 15 from the learning apparatus 3 or an external apparatus such as a storage apparatus not illustrated in FIG. 2C-2. Moreover, the external interface 268 is an interface for receiving the data of the document image 13 from the image input apparatus 2 or an external apparatus such as a storage apparatus not illustrated in FIG. 2C-2.

<Processing Sequence>

Figure 3B:
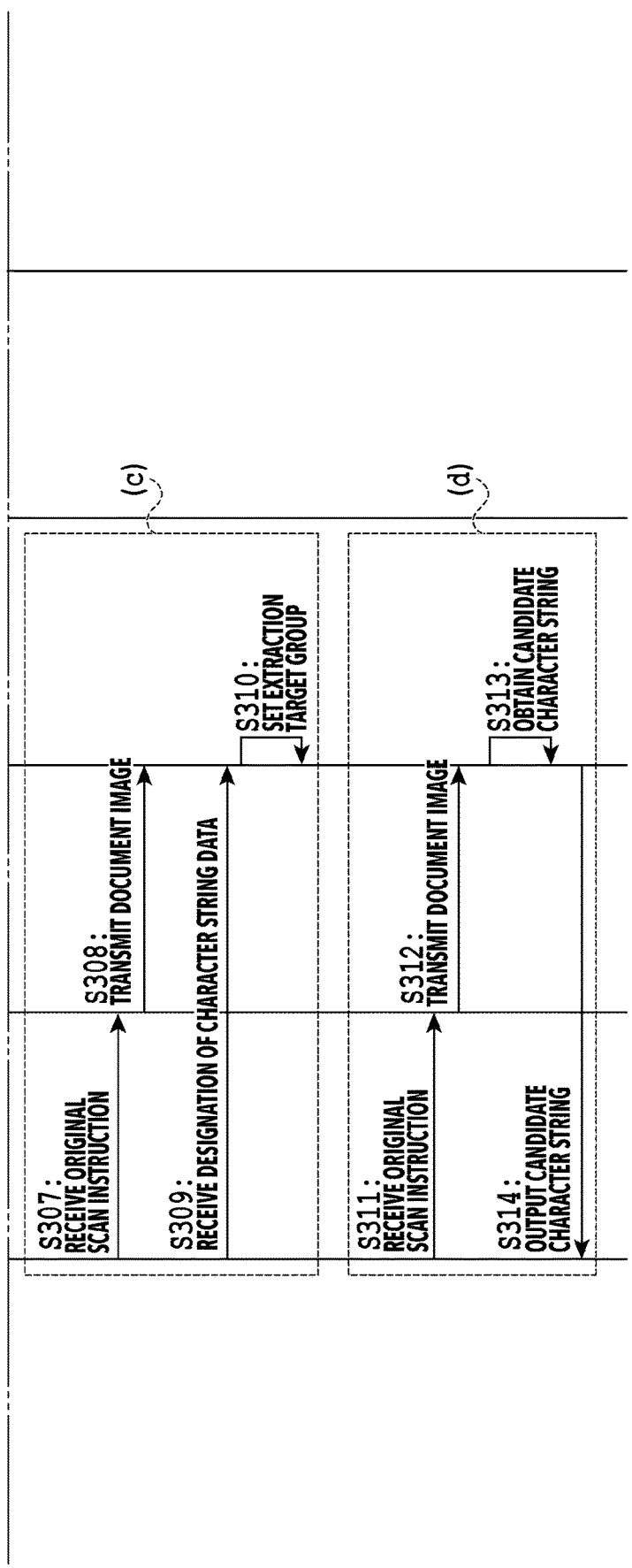

A processing sequence of the information processing system 1 is described with reference to FIGS. 3A and 3B. FIGS. 3A and 3B are sequence diagrams illustrating an example of the processing sequence of the information processing system 1 according to the first embodiment. As illustrated as an example in FIGS. 3A and 3B, in the information processing system 1, the processing sequence can be divided into four processing sequences of (a) to (d). Note that, in the description of FIGS. 3A and 3B, reference sign "S" means step.

Reference sign (a) illustrated in FIG. 3A denotes a processing sequence in which the learning apparatus 3 generates the character string classifier 15. The processing sequence of (a) illustrated in FIG. 3A is executed in advance of execution of any of the processing sequences of (b) to (d) illustrated in FIG. 3A or 3B. In the processing sequence of (a) illustrated in FIG. 3A, in S301, the engineer developing the information processing system 1 first inputs multiple document image samples 14 into the learning apparatus 3. Specifically, for example, the engineer inputs information indicating locations and the like of the multiple document image samples 14 to instruct the learning apparatus 3 to obtain the document image samples 14. The learning apparatus 3 obtains the document image samples 14 based on the input from the engineer.

After S301, in S302, the learning apparatus 3 first obtains data of character strings included in a document image of each of the document image samples 14. Next, the learning apparatus 3 generates a learned model by performing machine learning based on the obtained character string data and generates multiple attribute groups. Moreover, the learning apparatus 3 generates the character string classifier 15 based on the learned model. The character string classifier 15 generated in this case is a classifier that receives a feature vector corresponding to each piece of character string data as an explanatory variable and infers an attribute group to which the character string data corresponding to the received feature vector belongs among the generated multiple attribute groups and that outputs the result of the inference. The character string classifier 15 may be a classifier that internally includes a language model that converts the character string data to the feature vector and that receives the character string data as the explanatory variable. After S302, in S303, the learning apparatus 3 transmits the generated character string classifier 15 to the information processing apparatus 4. The information processing apparatus 4 obtains the character string classifier 15 transmitted from the learning apparatus 3 and saves the character string classifier 15 in the storage 265 included in the information processing apparatus 4.

Figure 4:
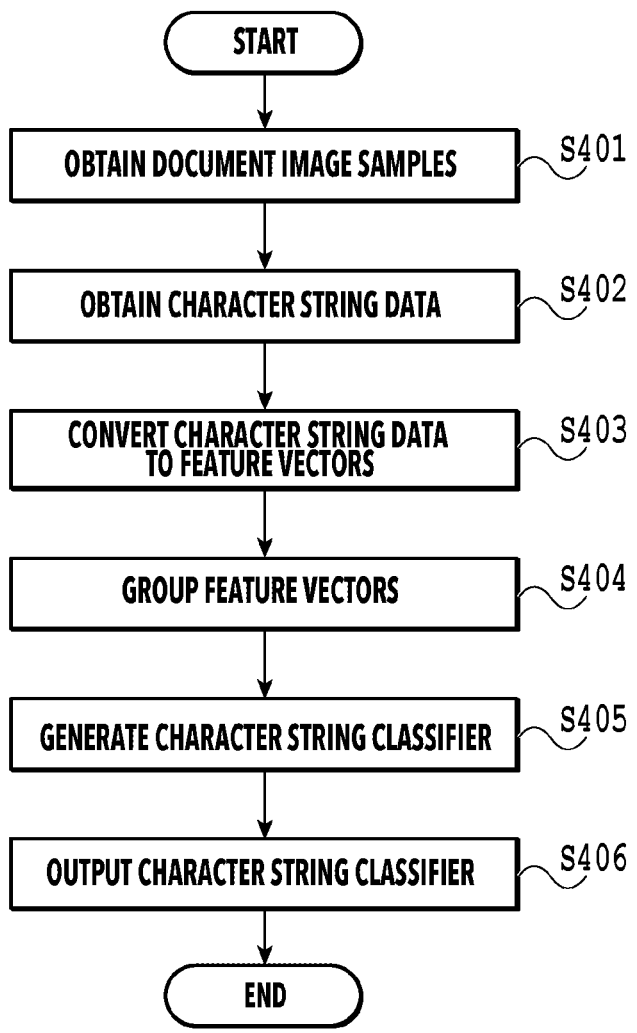
FIG. 4 is a flowchart illustrating an example of a flow of a process in the learning apparatus according to the first embodiment.

Note that details of the processing sequence of (a) illustrated in FIG. 3A is described later by using FIG. 4.

Reference sign (b) illustrated in FIG. 3A denotes a processing sequence of setting an extraction target group to be used in extraction of data of candidate character strings in the later-described processing sequence of (d) illustrated in FIG. 3B. Specifically, the processing sequence of (b) illustrated in FIG. 3A is a processing sequence of setting an attribute group to which data of a character string belongs as the extraction target group, the character string selected from among one or more character string included in a document image 13 by an operation input from the engineer. Note that the processing sequence of (b) illustrated in FIG. 3A is performed by the engineer during development of the information processing apparatus 4. Meanwhile, the after-mentioned processing sequence of (c) illustrated in FIG. 3B is performed by a user such as an end user (hereinafter, simply referred to as "end user") during an operation. Specifically, the processing sequence of (b) illustrated in FIG. 3A is a processing sequence in which, instead of the end user, the engineer performs the setting of the extraction target group to be performed in the processing sequence of (c) illustrated in FIG. 3B, during the development.

In the processing sequence of (b) illustrated in FIG. 3A, in S304, the engineer first inputs data of a document image 13 into the information processing apparatus 4. Specifically, for example, the engineer inputs information indicating location and the like of the data of the document image 13 to instruct the information processing apparatus 4 to obtain the data of the document image 13. The information processing apparatus 4 obtains the data of the document image 13 based on the input from the engineer. After S304, in S305, the information processing apparatus 4 first obtains one or more pieces of data of character strings included in the document image 13. Next, the information processing apparatus 4 receives, from the engineer, an operation input for designating a character string desired by the engineer from among the obtained one or more pieces of character string data. After S305, in S306, the information processing apparatus 4 first identifies an attribute group to which the character string designated by the operation input received in S305 belongs by using the character string classifier 15 obtained in S303. Next, the information processing apparatus 4 designates the identified attribute group as an extraction target group and saves information (hereinafter, referred to as "extraction target group information") indicating the extraction target group in the storage 265 or the like. Note that details of the processing sequence of (b) illustrated in FIG. 3A are described later by using FIG. 5.

Reference sign (c) illustrated in FIG. 3B denotes a processing sequence of setting the extraction target group to be used in the extraction of data of candidate character strings in the later-described processing sequence of (d) illustrated in FIG. 3B. Note that the processing sequence of (c) illustrated in FIG. 3B is performed by the end user during an operation and is similar to the aforementioned processing sequence of (b) illustrated in FIG. 3A. Specifically, the processing sequence of (c) illustrated in FIG. 3B is a processing sequence of setting the attribute group to which a character string belongs, as the extraction target group, the character string selected from among the one or more character strings included in the document image 13 by an operation input from the end user.

In the processing sequence of (c) illustrated in FIG. 3B, in S307, for example, the end user first places an original 11 on the image input apparatus 2 and instructs the image input apparatus 2 to scan the original 11. Upon receiving the instruction, the image input apparatus 2 optically scans the original 11 and obtains a document image 13. After S307, in S308, first, the image input apparatus 2 transmits the data of the document image 13 obtained in S307 to the information processing apparatus 4. The information processing apparatus 4 obtains the document image 13 by receiving the data of the document image 13 transmitted from the image input apparatus 2. Note that the information processing apparatus 4 only needs to obtain the document image 13 and the obtaining source of the data of the document image 13 may be the image input apparatus 2, a storage device such as the storage 265, or the like.

After S308, in S309, the information processing apparatus 4 first obtains one or more pieces of data of character strings included in the document image 13 for the data of the document image 13 obtained in S308. Next, the information processing apparatus 4 receives, from the end user, an operation input for designating a character string desired by the end user from among the obtained one or more pieces of character string data. After S309, in S310, the information processing apparatus 4 first identifies the attribute group to which the character string designated by the operation input received in S309 belongs, by using the character string classifier 15 obtained in S303. Next, the information processing apparatus 4 designates the identified attribute group as an extraction target group and saves extraction target group information in the storage 265 or the like. Note that details of the processing sequence of (c) illustrated in FIG. 3B are described later by using FIG. 5.

Reference sign (d) illustrated in FIG. 3B denotes a processing sequence of extracting data of candidate character strings from among one or more pieces of data of character strings included in document images 13 based on the extraction target group preset in the processing sequence of (b) or (c) illustrated in FIG. 3A or 3B. Note that, in (d) illustrated in FIG. 3B, the data of candidate character strings can be repeatedly extracted from multiple document images 13 having layouts different from a layout of the document image 13 used in the execution of the processing sequence of (b) or (c) illustrated in FIG. 3A or 3B. Moreover, in (d) illustrated in FIG. 3B, one or more candidate character strings can be extracted by repeatedly determining whether each of the one or more of the character strings included in the document images 13 correspond to the candidate character string or not.

In the processing sequence of (d) illustrated in FIG. 3B, in S311, first, the end user places an original 11 on the image input apparatus 2 and instructs the image input apparatus 2 to scan the original 11. Upon receiving the instruction, the image input apparatus 2 optically scans the original 11 and obtains a document image 13. After S311, in S312, first, the image input apparatus 2 transmits the data of the document image 13 obtained in S311 to the information processing apparatus 4. The information processing apparatus 4 obtains the document image 13 by receiving the data of the document image 13 transmitted from the image input apparatus 2. Note that the information processing apparatus 4 only needs to obtain the document image 13 and the obtaining source of the data of the document image 13 may be the image input apparatus 2, a storage device such as the storage 265, or the like.

After S312, in S313, the information processing apparatus 4 first obtains one or more pieces of data of character strings included in the document image 13, for the data of the document image 13 obtained in S312. Next, the information processing apparatus 4 identifies an attribute group to which each of the obtained one or more pieces of character string data belongs. Then, the information processing apparatus 4 extracts data of a candidate character string from among the one or more pieces of data of character strings included in the obtained document image 13, based on the attribute group identified for each of the one or more pieces of character string data and the preset extraction target group in the processing sequence of (b) or (c) illustrated in FIG. 3A or 3B. After S313, in S314, the information processing apparatus 4 performs display output such that the end user can view the data of the candidate character string extracted in S313. Note that details of the processing sequence of (d) illustrated in FIG. 3B are described later by using FIG. 6.

<Process of Generating Character String Classifier>

A flow of a process in which the learning apparatus 3 generates the character string classifier 15 in (a) illustrated in FIG. 3A is described with reference to FIG. 4. FIG. 4 is a flowchart illustrating an example of the flow of the process in which the learning apparatus 3 according to the first embodiment generates the character string classifier 15. Note that, in the description of FIG. 4, reference sign "S" means step. Moreover, for example, a program configured to execute each step illustrated in FIG. 4 is stored in the ROM 232, the RAM 234, or the storage 235 of the learning apparatus 3 and is executed by the CPU 231 or the GPU 239 of the learning apparatus 3.

First, in S401, the sample obtaining unit 31 obtains multiple document image samples 14. Specifically, for example, the sample obtaining unit 31 obtains data of document images handled in a back office of human resource, medical care, accounting, or the like as the document image samples 14. In this case, the sample obtaining unit 31 may target and obtain only the data of the document images handled in a specific business field such as, for example, document images handled in the medical back office, as the document image samples 14. Alternatively, the sample obtaining unit 31 may target and obtain the data of the document images handled in multiple business fields different from each other such as document images handled in the business fields of human resources, medical care, and accounting.

Next, in S402, the character string obtaining unit 32 obtains data of character strings included in each of the multiple document image samples 14 obtained by the sample obtaining unit 31. Specifically, for example, the character string obtaining unit 32 executes the OCR process on each of the multiple document image samples 14 and obtains multiple pieces of character string data acquired as a character recognition result of the OCR process. For example, the character string obtaining unit 32 executes the OCR process in units of word segments arranged to be segmented by a space, a rule, or the like in the document image, by using a block selection technique that identifies units of objects forming a document image of a semi-fixed form document. Since the block selection is a well-known technique, description thereof is omitted. Alternatively, for example, the character string obtaining unit 32 may execute the OCR process in units of divided words by dividing a text included in a document image of a non-fixed form document into words by using a well-known morphological analysis method.

Next, in S403, the vector conversion unit 33 converts each of the multiple pieces of character string data obtained by the character string obtaining unit 32 to a feature vector. Specifically, for example, the vector conversion unit 33 converts the character string data to the feature vector by using a well-known method such as Word2Vec, GloVe, fastText, BERT, XLNet, or ALBERT. For example, the vector conversion unit 33 uses a language model of BERT obtained by learning in advance massive amounts of general documents registered in Web sites such as Wikipedia (registered trademark). The vector conversion unit 33 can thereby convert the character string data of each character string included in the document into a feature vector expressed by a numerical value with 768 dimensions or the like.

Figure 11A:
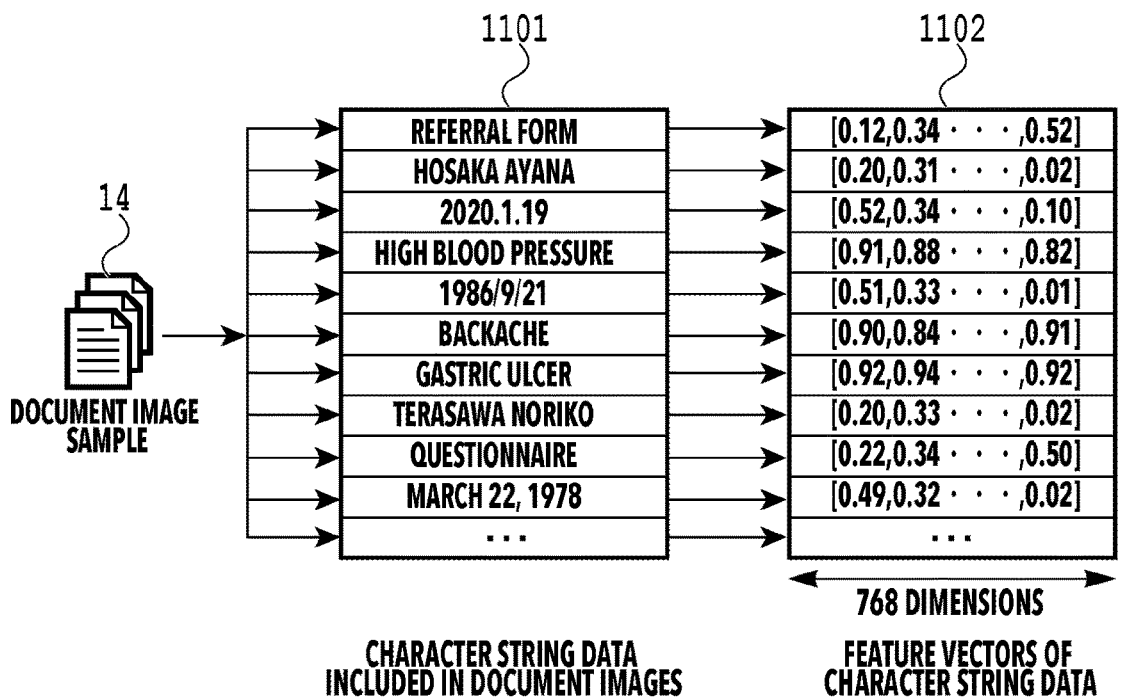
FIG. 11A is a conceptual diagram illustrating an example of how data of character string is converted to a feature vector and FIG. 11B is a conceptual diagram illustrating an example of how multiple feature vectors are grouped into multiple attribute groups.
Figure 11B:
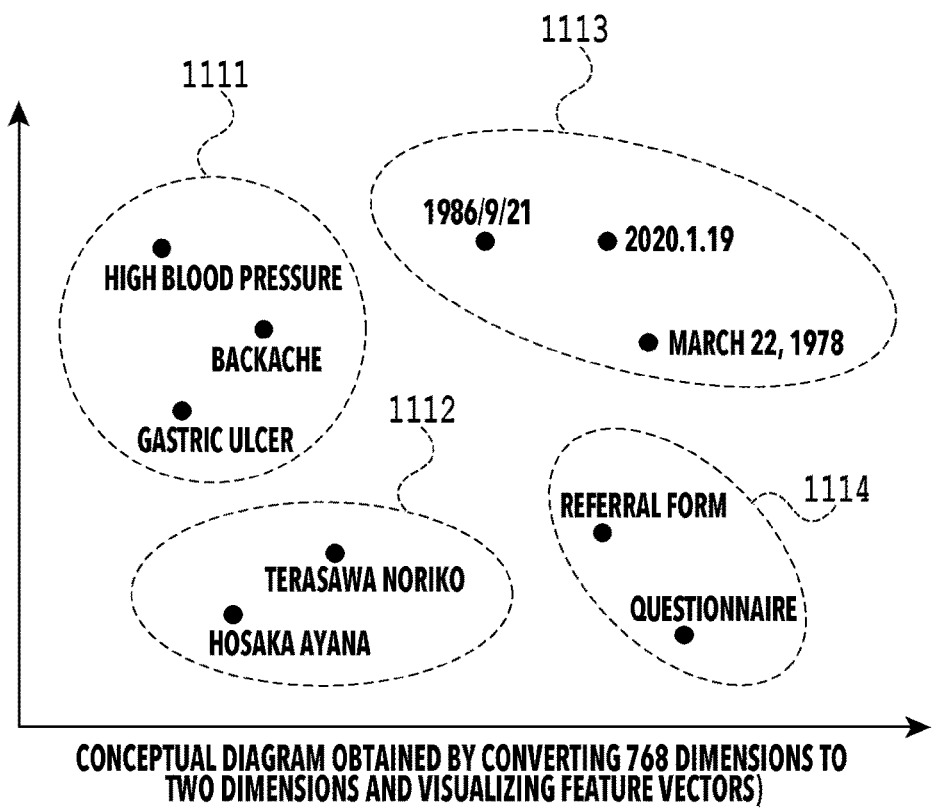

The character string data and the feature vector corresponding to the character string data are described with reference to FIGS. 11A and 11B. FIGS. 11A and 11B are explanatory diagrams for explaining examples of the character string data and the feature vector. Specifically, FIG. 11A is a conceptual diagram illustrating an example of how data of each of character strings included in the document image samples 14 is converted to a feature vector. As illustrated in FIG. 11A, in a character string data group 1101 that is multiple pieces of data of character strings included in the document image samples 14, each piece of character string data can be converted to a feature vector expressed by a numerical value with 768 dimensions by using, for example, a learned language model of BERT. FIG. 11A illustrates a feature vector group 1102 as multiple feature vectors corresponding to the character string data group 1101. FIG. 11B is described later.

After S403, in S404, the learning unit 34 performs learning of a learning model in the middle of learning, by machine learning using the multiple feature vectors converted by the vector conversion unit 33 as data for learning. Specifically, the learning unit 34 groups the multiple feature vectors converted by the vector conversion unit 33 into multiple attribute groups by using a clustering method based on machine learning while using the feature vectors as the data for learning. In this case, the feature vector group 1102 generated by the vector conversion unit 33 indicates conceptual features of the pieces of character string data that are generally referred to as named entities, and indicates features of named entities including proper nouns such as personal names and names of places, named entities such as date and amount of money, and the like. The learning unit 34 uses such features to automatically group the feature vectors into multiple attribute groups by means of a clustering method which is one type of unsupervised machine learning, without manual provision of information indicating attributes as training data by the engineer or the like. In this case, a well-known technique including a hierarchical clustering method such as a furthest neighbor method or a nearest neighbor method, a non-hierarchical clustering method such as K-means or X-means, or the like may be used as the clustering method of grouping the feature vector group.

FIG. 11B is a conceptual diagram illustrating an example of how the multiple feature vectors are grouped into the multiple attribute groups by using the clustering method based on machine learning. Specifically, FIG. 11B is a diagram in which the feature vectors expressed by numerical values with 768 dimensions illustrated in FIG. 11A are converted to be dimensionally reduced to a two-dimensional plane by using a well-known technique such as PCA or t-SNE and are visualized. As illustrated in FIG. 11B, using the aforementioned clustering method on the feature vector group 1102 of the character string data illustrated in FIG. 11A allows the feature vectors to be automatically grouped into multiple attribute groups 1111, 1112, 1113, and 1114. It can be seen that the attribute groups 1111 to 1114 illustrated in FIG. 11B are each, for example, diseases name, personal name, date, or document name. Note that, in the grouping by the clustering method, each of the attribute groups 1111 to 1114 does not have information on what the attribute group indicates and only has information by which the attribute group can be identified (group ID).

Although the learning unit 34 is described as a unit that performs learning of the learning model in the middle of learning based on machining learning using the feature vectors as the data for learning, the present disclosure is not limited to this. Specifically, for example, the configuration may be as follows. A learning model is designed in advance to include a language model that converts character string data to a feature vector in the learning model in a design stage of the learning model, and the learning unit 34 performs learning of the learning model based on machine learning using the character string data as the data for learning. In this case, the learning apparatus 3 requires no vector conversion unit 33.

After completion of necessary or sufficient learning in S404, in S405, the classifier generation unit 35 first obtains a learned model that is a result of the learning by the learning unit 34. Next, the classifier generation unit 35 generates the character string classifier 15 based on the obtained learned model. In this case, the character string classifier 15 is a classifier that receives a feature vector of character string data as an explanatory variable and identifies an attribute group to which the character string corresponding to the received feature vector belongs, from among the multiple attribute groups generated by the aforementioned clustering method. Specifically, for example, the character string classifier 15 outputs the group ID as information indicating the identified attribute group.

Note that, for example, the classifier generation unit 35 may be achieved as a unit that reuses a combination of the character string data and the attribute group obtained by the aforementioned clustering method for the character string data as training data and reproduces results based on supervised machine learning. Moreover, for example, the classifier generation unit 35 may be achieved as a unit that simply calculates a barycentric position of each attribute group obtained by the aforementioned clustering method and determines an attribute group whose barycentric position is the nearest as an attribute group with the highest similarity. After S405, in S406, the classifier output unit 36 outputs the character string classifier 15 generated by the classifier generation unit 35 to the information processing apparatus 4 or a storage device not illustrated in FIG. 1 and the like. In the case where the character string classifier 15 does not internally include the language model that converts the character string data to the feature vector, the classifier output unit 36 may output a language model that converts the character string data to a feature vector that may be input into the character string classifier 15, in addition to the character string classifier 15. Description is given below assuming that the character string classifier 15 does not internally include the language model that converts the character string data to the feature vector. After S406, the learning apparatus 3 terminates the processes of the flowchart illustrated in FIG. 4.

<Process of Setting Extraction Target Group>

Figure 5:
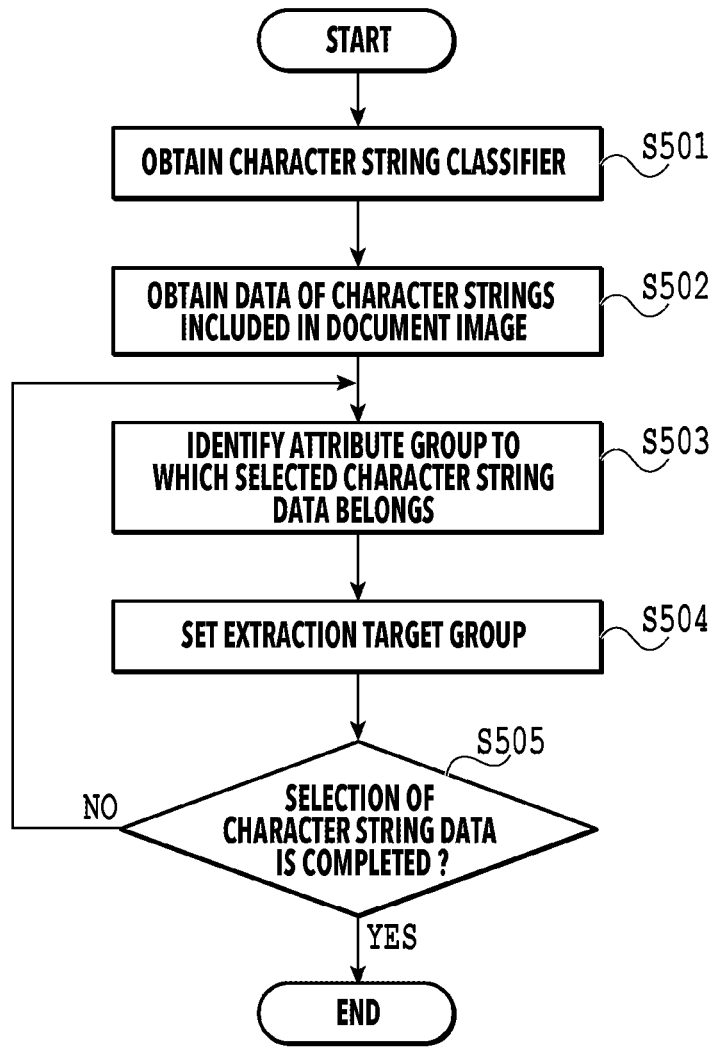
FIG. 5 is a flowchart illustrating an example of a flow of a process in the information processing apparatus according to the first embodiment.

A flow of a process in which the information processing apparatus 4 sets the extraction target group in (b) or (c) illustrated in FIG. 3A or 3B is described with reference to FIG. 5. FIG. 5 is a flowchart illustrating an example of the flow of the process in which the information processing apparatus 4 according to the first embodiment sets the extraction target group. Note that, in the description of FIG. 5, reference sign "S" means step. Moreover, for example, a program configured to execute each step illustrated in FIG. 5 is stored in the ROM 262, the RAM 264, or the storage 265 of the information processing apparatus 4 and is executed by the CPU 261 of the information processing apparatus 4.

First, in S501, the classifier obtaining unit 41 obtains the character string classifier 15. Next, in S502, the processing image obtaining unit 42 first obtains a document image 13 as an image corresponding to a document used to designate the extraction target group (hereinafter, referred to as "extraction target document"). Specifically, the processing image obtaining unit 42 obtains the document image 13 by receiving data of the document image 13 transmitted by the image input apparatus 2. The processing image obtaining unit 42 may obtain the document image 13 by reading the data of the document image 13 from a storage device such as the storage 265 in which the data of the document image 13 is stored in advance. Next, the character string obtaining unit 43 obtains one or more pieces of data of character strings included in the document image 13 obtained by the processing image obtaining unit 42 by executing the OCR process on the document image 13. Then, the character string obtaining unit 43 obtains character string data corresponding to a character string designated by an operation input by a user such as the engineer or the end user, from among the one or more pieces of data of character strings included in the document image 13.

Figure 12A:
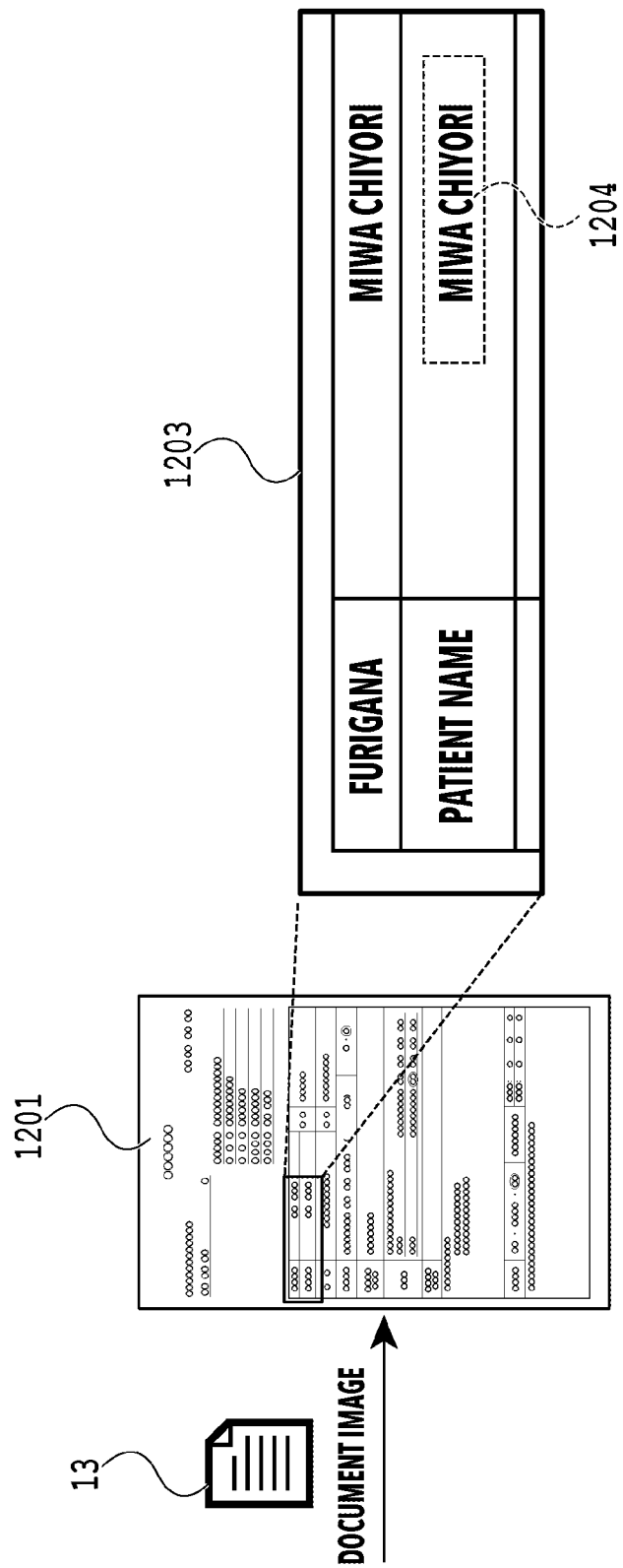
FIG. 12A is a diagram illustrating an example of a document image and FIG. 12B is an explanatory diagram for explaining an example of a setting screen.
Figure 12B:
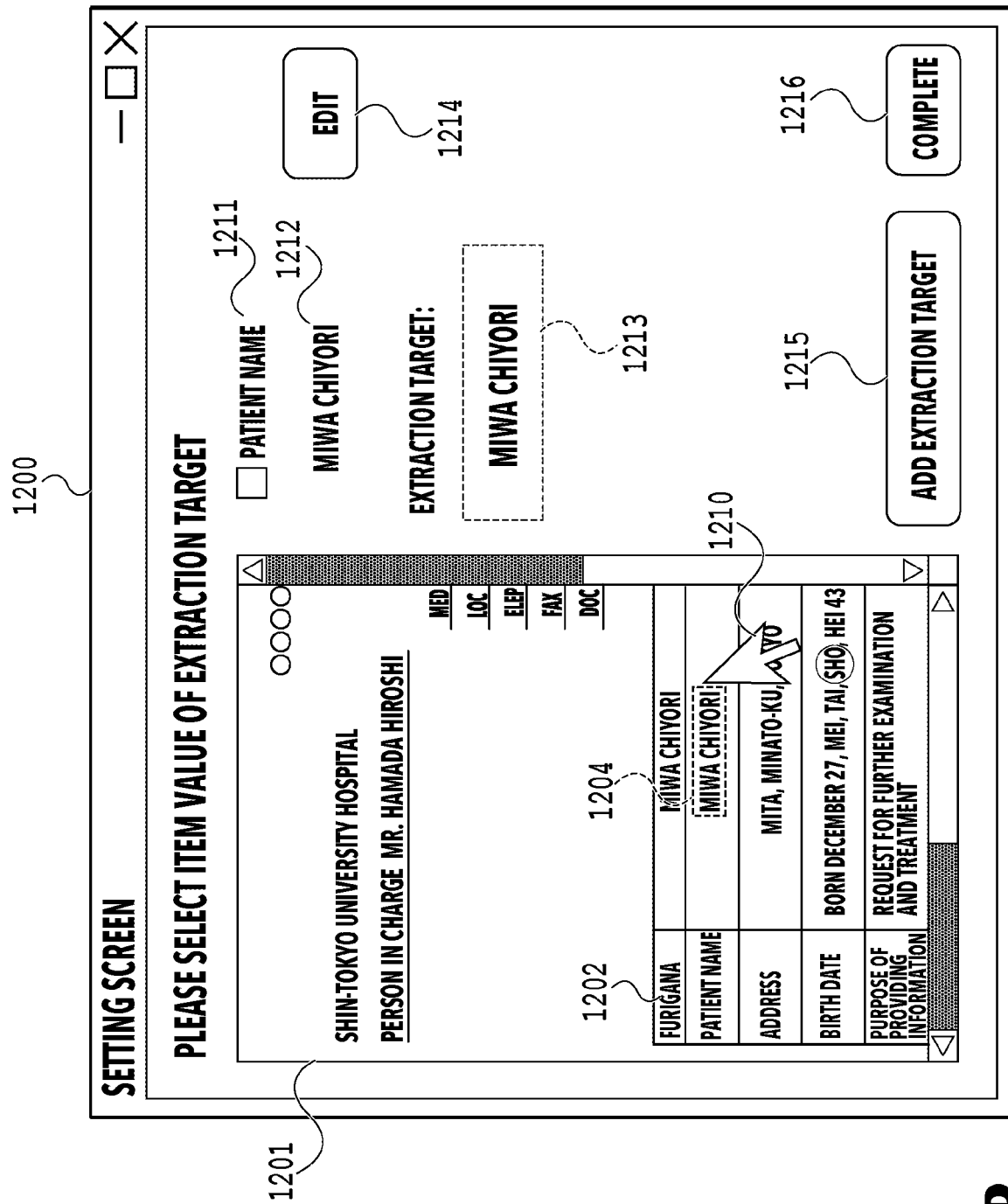

A setting screen in which the user designates a desired character string from among the one or more pieces of data of character strings included in the document image 13 is described with reference to FIGS. 12A and 12B. FIGS. 12A and 12B are explanatory diagrams for explaining an example of the setting screen according to the first embodiment. Specifically, FIG. 12A is a diagram illustrating an example of the document image 13 obtained by the processing image obtaining unit 42 according to the first embodiment. FIG. 12A illustrates an image 1201 visualizing the document image 13 and an image 1203 illustrating a partial image region of the image 1201 in an enlarged manner. Moreover, in the image 1203, there are illustrated a character region 1202 of "patient name" representing an item and a character region 1204 of "Miwa Chiyori" of a proper noun (personal name) representing an item value of this item.

FIG. 12B is a diagram illustrating an example of a setting screen 1200 that is outputted to and displayed on a display device by the information processing apparatus 4 according to the first embodiment. Specifically, the image 1201 illustrated in FIG. 12A and visualizing the document image 13 is displayed in a preview screen region illustrated in FIG. 12B. Moreover, the character region 1202 of "patient name" that represents the item and the character region 1204 of "Miwa Chiyori" that is the item value corresponding to this item are illustrated in the image 1201 displayed in the preview screen region illustrated in FIG. 12B. For example, the user selects a desired character region in the image 1201 displayed in the preview screen region illustrated in FIG. 12B. This selection is achieved by, for example, performing position designation 1210 on the character region by using a pointer or the like. For example, in the case where the user selects the character region 1204 corresponding to "Miwa Chiyori" by performing the position designation, an image 1213 corresponding to the character region 1204 is obtained and displayed as an item value of "extraction target:". Moreover, in the setting screen 1200 illustrated in FIG. 12B, character string data obtained as a result of the OCR process on the image 1213 is displayed as an item value 1212 corresponding to an item 1211 represented by "patient name".

Note that the item 1211 represented by "patient name" is an item preset by a user such as the engineer. The item 1211 may be an item additionally set by a user such as the end user by pressing of an add button 1215 for adding an item. In the case where the user determines that the character string data such as the OCR result displayed as the item value 1212 in the setting screen of FIG. 12B is incorrect, the user can press an edit button 1214 to correct the character string data. In the case where the user completes selecting all pieces of desired character string data from among the one or more pieces of data of character strings included in the document image 13, the user presses a complete button 1216 in the setting screen illustrated in FIG. 12B to terminate the display.

After S502, in S503, first, the vector conversion unit 44 converts each of the one or more pieces of character string data selected by the user in S502, to a feature vector. Next, the attribute group identification unit 45 inputs the feature vector converted by the vector conversion unit 44 into the character string classifier 15 obtained by the classifier obtaining unit 41 and identifies an attribute group to which the character string data corresponding to the inputted feature vector belongs. After S503, in S504, the extraction target setting unit 46 sets the attribute group identified by the attribute group identification unit 45 as the extraction target group and outputs the extraction target group information to a storage device such as the storage 265 to store and save the extraction target group information in the storage device. The extraction target group information is information by which the attribute group can be identified and is, for example, group ID information.

After S504, in S505, for example, the character string obtaining unit 43 determines whether the selection of data of character string to be designated as the extraction target is completed or not, based on an operation input by a user such as the engineer or the end user. Specifically, for example, in the case where a new character region is selected in the image 1201 displayed in the preview screen region illustrated in FIG. 12B, the character string obtaining unit 43 determines that the selection of data of character string to be designated as the extraction target is not completed. In the case where the character string obtaining unit 43 determines that the selection of data of character string to be designated as the extraction target is not completed, the information processing apparatus 4 returns to the process of S503 and executes the processes of S503 to S505 to add the extraction target group information corresponding to the data of character string that is newly designated. Specifically, in this case, the information processing apparatus 4 repeatedly executes the processes of S503 to S505 to add the extraction target group information until the character string obtaining unit 43 determines that the selection of data of character string to be designated as the extraction target is completed.

Meanwhile, for example, in the case where the complete button 1216 in the setting screen illustrated in FIG. 12B is pressed, the character string obtaining unit 43 determines that the selection of data of character string to be designated as the extraction target is completed. In the case where the character string obtaining unit 43 determines that the selection of data of character string to be designated as the extraction target is completed, the information processing apparatus 4 terminates the processes of the flowchart illustrated in FIG. 5 and waits until the processing image obtaining unit 42 obtains a new document image 13. In the case where the processing image obtaining unit 42 obtains a new document image 13, the information processing apparatus 4 executes the processes of the flowchart illustrated in FIG. 5 again. Note that, in this case, the information processing apparatus 4 may skip the process of S501 and execute only the processes of S502 and beyond among the processes of the flowchart illustrated in FIG. 5.

<Process of Extracting Candidate Character Strings>

Figure 6:
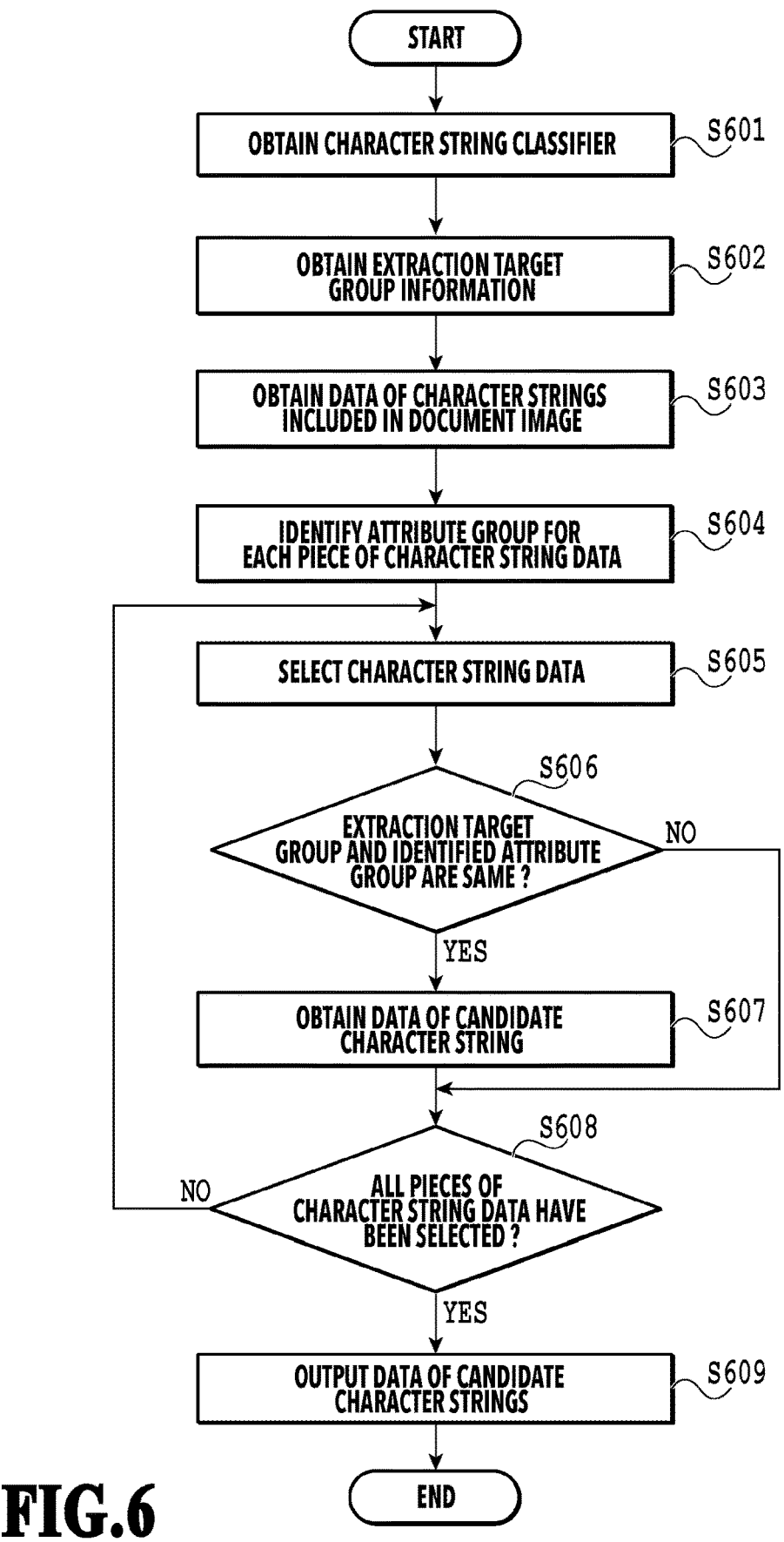
FIG. 6 is a flowchart illustrating an example of a flow of a process in the information processing apparatus according to the first embodiment.

A flow of a process in which the information processing apparatus 4 extracts the data of candidate character strings from among the one or more pieces of data of character strings included in the document image 13 in the processing sequence of (d) illustrated in FIG. 3B is described with reference to FIG. 6. FIG. 6 is a flowchart illustrating an example of the flow of the process in which the information processing apparatus 4 according to the first embodiment extracts the data of candidate character strings from among the one or more pieces of data of character strings included in the document image 13. Note that, in the description of FIG. 6, reference sign "S" means step. Moreover, for example, a program configured to execute each step illustrated in FIG. 6 is stored in the ROM 262, the RAM 264, or the storage 265 of the information processing apparatus 4 and is executed by the CPU 261 of the information processing apparatus 4.

First, in S601, the classifier obtaining unit 41 obtains the character string classifier 15. Next, in S602, the candidate extraction unit 47 obtains the extraction target group information saved in S504 illustrated in FIG. 5. Note that, in the case where there are multiple pieces of extraction target group information saved in S504, the candidate extraction unit 47 obtains the multiple pieces of extraction target group information. Next, in S603, the processing image obtaining unit 42 first obtains a document image 13 as an image corresponding to a document from which the data of candidate character strings is to be extracted (hereinafter, referred to as "processing target document"). Specifically, for example, the processing image obtaining unit 42 obtains the document image 13 by receiving data of the document image 13 transmitted by the image input apparatus 2. The processing image obtaining unit 42 may obtain the document image 13 by reading the data of the document image 13 from a storage device such as the storage 265 in which the data of the document image 13 is stored in advance. Next, the character string obtaining unit 43 obtains one or more pieces of data of character strings included in the document image 13 obtained by the processing image obtaining unit 42 by executing the OCR process or the like on the document image 13.

After S603, in S604, first, the vector conversion unit 44 converts each of the one or more pieces of character string data obtained by the character string obtaining unit 43 in S603, to a feature vector. Next, the attribute group identification unit 45 inputs the feature vector converted by the vector conversion unit 44 into the character string classifier 15 obtained by the classifier obtaining unit 41 in S601 for each piece of character string data. Then, the attribute group identification unit 45 receives a result outputted by the character string classifier 15 for each input and identifies an attribute group to which the character string data corresponding to the inputted feature vector belongs for each piece of character string data. In the following description, the attribute group identified by the attribute group identification unit 45 is referred to as identified attribute group.

After S604, in S605, the candidate extraction unit 47 selects one of the one or more pieces of character string data obtained by the character string obtaining unit 43 in S603. After S605, in S606, the candidate extraction unit 47 determines whether the extraction target group indicated by the extraction target group information obtained in S602 and the identified attribute group corresponding to the character string data selected in S605 are the same or not. In the case where there are multiple pieces of extraction target group information obtained in S602, the candidate extraction unit 47 determines whether the identified attribute group is the same as at least one of the extraction target groups indicated by the respective pieces of extraction target group information or not. In the case where the candidate extraction unit 47 determines that the extraction target group and the identified attribute group are the same in S606, in S607, the candidate extraction unit 47 extracts the character string data selected in S605 as the data of candidate character string. After S607 or in the case where the candidate extraction unit 47 determines that the extraction target group and the identified attribute group are not the same in S606, the information processing apparatus 4 executes the process of S608.

In S608, the candidate extraction unit 47 determines whether all of the one or more pieces of character string data obtained by the character string obtaining unit 43 in S603 have been selected in S605. In the case where, in S608, the candidate extraction unit 47 determines that not all of the one or more pieces of character string data obtained by the character string obtaining unit 43 have been selected in S605, the information processing apparatus 4 returns to the process of S605 and repeatedly executes S605 to S606. Note that, in this case, in S605, the candidate extraction unit 47 selects character string data that has not been selected yet from among the one or more pieces of character string data obtained by the character string obtaining unit 43 in S603. In the case where, in S608, the candidate extraction unit 47 determines that all of the one or more pieces of character string data obtained by the character string obtaining unit 43 have been selected in S605, in S609, the candidate output unit 48 outputs the data of candidate character strings as an extraction result. Specifically, for example, the candidate output unit 48 generates a display image for including the extraction result in a check screen, and outputs and displays the display image on a display device.

Figure 13A:
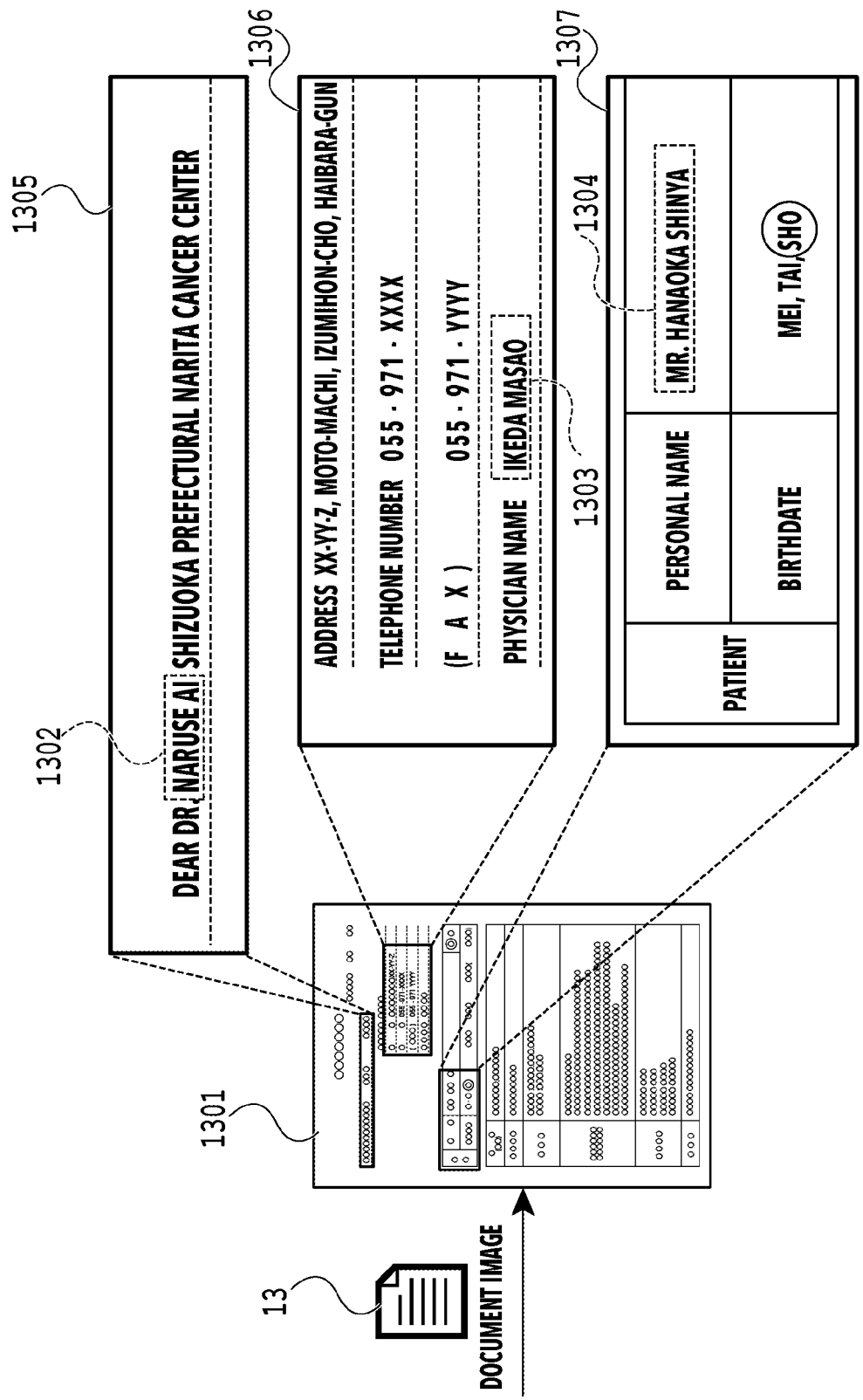
FIG. 13A is a diagram illustrating an example of a document image and FIG. 13B is an explanatory diagram for explaining an example of a check screen.
Figure 13B:
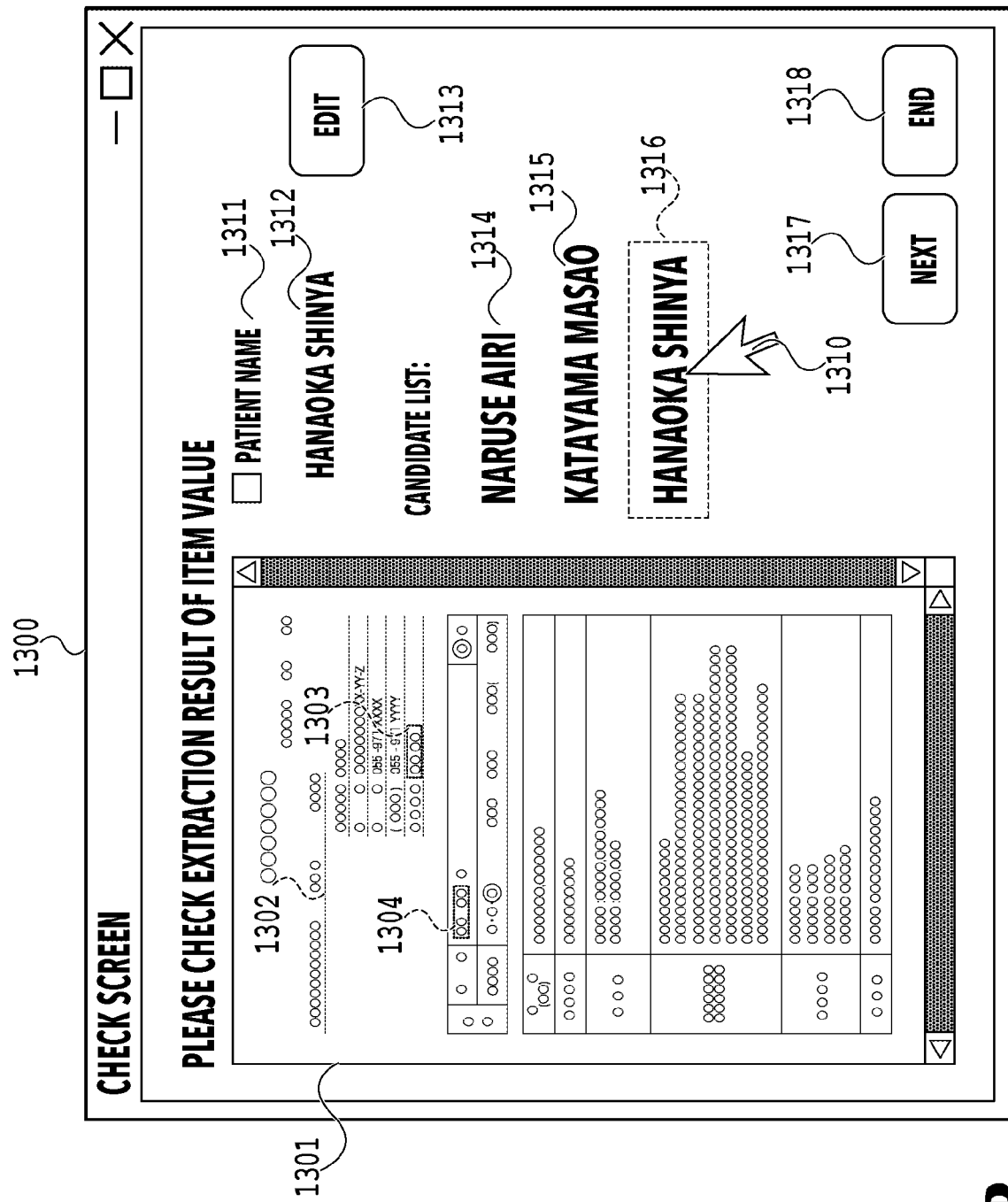

A check screen 1300 outputted by the candidate output unit 48 is described with reference to FIGS. 13A and 13B. FIGS. 13A and 13B are explanatory diagrams for explaining an example of the check screen 1300 outputted by the candidate output unit 48 according to the first embodiment. Specifically, FIG. 13A is a diagram illustrating an example of the document image 13 obtained by the processing image obtaining unit 42 according to the first embodiment. FIG. 13A illustrates a document image 1301 visualizing the document image 13 and images 1305, 1306, and 1307 illustrating partial image regions in the image 1301 in an enlarged manner. Moreover, a character region 1302 of "Naruse Airi", a character region 1303 of "Katayama Masao", and a character region 1304 of "Hanaoka Shinya" of proper nouns (personal names) representing item values are illustrated in the images 1305, 1306, and 1307.

FIG. 13B is a diagram illustrating an example of the check screen 1300 outputted and displayed on a display device by the candidate output unit 48 included in the information processing apparatus 4 according to the first embodiment. Specifically, the document image 1301 illustrated in FIG. 13A is displayed in a preview screen region illustrated in FIG. 13B. Moreover, the character regions 1302, 1303, and 1304 are displayed as the candidate character strings corresponding to the "patient name" representing the item, in the document image 1301 displayed in the preview screen region illustrated in FIG. 13B, in a state where the character regions 1302, 1303, and 1304 can be checked. Moreover, images 1314, 1315, and 1316 corresponding to the character regions 1302, 1303, and 1304 are displayed as item values of "candidate list:" in a state where the images 1314, 1315, and 1316 can be checked. As described above by using FIG. 12B, the "patient name" that is the item of the extraction target is preset by a user such as the engineer or the end user.

For example, the user selects one of the images 1314, 1315, and 1316 in the displayed candidate list by performing an operation input in the check screen 1300 illustrated in FIG. 13B. This selection is achieved by performing position designation 1310 with a pointer or the like. For example, in the case where the user selects the image 1316 by an operation input, the character string data 1312 obtained by performing the OCR process on the selected image 1316 is displayed. The user can switch the character string data to be outputted by changing the selected image 1314, 1315, or 1316.

Moreover, in the check screen 1300 illustrated in FIG. 13B, in the case where the displayed character string data 1312 that is the displayed result of the OCR process is incorrect, the end user can correct the character string data 1312 by pressing an "edit" button 1313. Furthermore, in the case where the information processing apparatus 4 receives pressing of a "next" button 1317 by the user, the display transitions to a check screen for checking a piece of data of candidate character string obtained next among the one or more pieces of data of character strings included in the document image 13. Moreover, in the case where the information processing apparatus 4 receives pressing of an "end" button 1318 by the user, output of the candidate character strings for the document image 13 is completed and the check screen is terminated.

As described above, the information processing apparatus 4 can extract character string data desired by the user from an image of a document such as a semi-fixed form document or a non-fixed form document that has a layout different from a predetermined layout, as a candidate of an item value corresponding to a predetermined item. Specifically, the information processing apparatus 4 can extract character string data, belonging to the same attribute group as an attribute group (extraction target group) designated by using an extraction target document, from a processing target document and extract the extracted one or more pieces of character string data as data of candidate character strings. In the first embodiment, regularity in notation of a character string is not used in this extraction. Accordingly, the information processing apparatus 4 can extract not only candidates of items values of items that are noted by regular character strings such as money amount, date, and account number but also candidates of item values corresponding to items that are noted by irregular character strings such as personal name, address, occupation, and relationship, as the candidate character strings.

Moreover, in the information processing apparatus 4 according to the first embodiment, since there is no need to prepare a dictionary of item values in advance as a database, cost of maintaining or managing the dictionary can be reduced. Furthermore, the first embodiment employs a method in which item values are directly extracted based on an attribute group to which the item values belong, unlike a method in which item values are extracted based on an item name. Accordingly, the item values can be extracted without being affected by an item name varying in notation such as "personal name" and "name".

Second Embodiment

Figure 7:
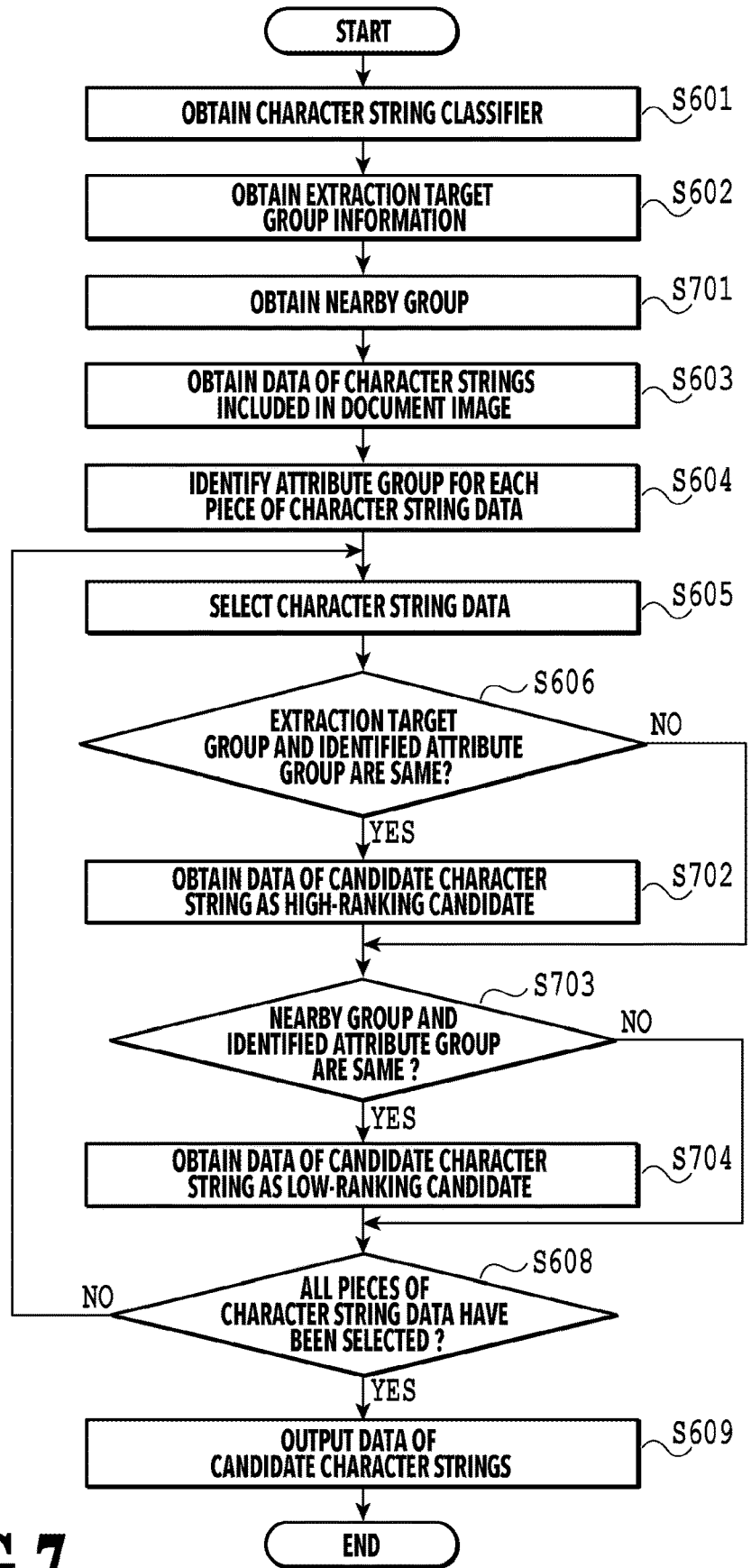
FIG. 7 is a flowchart illustrating an example of a flow of a process in the information processing apparatus according to a second embodiment.

An information processing system 1 according to a second embodiment (hereinafter, simply referred to as "information processing system 1") is described with reference to FIGS. 7, 14A, and 14B. A configuration of the information processing system 1 includes the image input apparatus 2, the learning apparatus 3, and the information processing apparatus 4 like the configuration of the information processing system 1 according to the first embodiment illustrated as an example in FIG. 1. Moreover, the image input apparatus 2, the learning apparatus 3, and the information processing apparatus 4 are coupled to be capable of communicating with one another via the network 5.

The information processing apparatus 4 according to the first embodiment is as follows. First, the extraction target group is preset by using the document image 13 corresponding to the extraction target document. Then, the character string data belonging to the same attribute group as the extraction target group is extracted from among one or more pieces of data of character strings included in the document image 13 corresponding to the processing target document, as the data of candidate character strings. Meanwhile, the information processing apparatus 4 according to the second embodiment extracts not only the character string data belonging to the same attribute group as the extraction target group but also character string data belonging to an attribute group located near the extraction target group, as the data of candidate character strings. In the following description, the information processing apparatus 4 according to the second embodiment is simply noted as "information processing apparatus 4". Moreover, in the following description, the attribute group located near the extraction target group is referred to as "nearby group".

A configuration of the information processing apparatus 4 is same as the configuration of the information processing apparatus 4 according to the first embodiment illustrated as an example in FIG. 2C-1. Specifically, the information processing apparatus 4 includes the classifier obtaining unit 41, the processing image obtaining unit 42, the character string obtaining unit 43, the vector conversion unit 44, the attribute group identification unit 45, the extraction target setting unit 46, the candidate extraction unit 47, and the candidate output unit 48. However, the candidate extraction unit 47 according to the second embodiment (hereinafter, simply referred to as "candidate extraction unit 47") has different functions from the candidate extraction unit 47 according to the first embodiment. Details of the candidate extraction unit 47 are described later.

Moreover, processes of the units configured to function in the information processing apparatus 4 are performed by hardware such as an ASIC or FPGA incorporated in the information processing apparatus 4 or software using a memory such as a RAM and a processor such as a CPU. Specifically, for example, the information processing apparatus 4 is formed of the computer illustrated as an example in FIG. 2C-2. Note that, since the image input apparatus 2 according to the second embodiment (hereinafter, simply referred to as "image input apparatus 2") and the learning apparatus 3 according to the second embodiment (hereinafter, simply referred to as "learning apparatus 3") are the same as the image input apparatus 2 and the learning apparatus 3 according to the first embodiment, description thereof is omitted.

<Process of Extracting Candidate Character Strings>

A flow of a process in which the information processing apparatus 4 extracts the data of candidate character strings corresponding to character strings included in the document image 13 in the processing sequence of (d) illustrated in FIG. 3B is described with reference FIG. 7. FIG. 7 is a flowchart illustrating an example of the flow of the process in which the information processing apparatus 4 according to the second embodiment extracts the data of candidate character strings corresponding to the character strings included in the document image 13. Note that, in the description of FIG. 7, reference sign "S" means step. Moreover, for example, a program configured to execute each step illustrated in FIG. 7 is stored in the ROM 262, the RAM 264, or the storage 265 of the information processing apparatus 4 and is executed by the CPU 261 of the information processing apparatus 4. Furthermore, description of the steps denoted in FIG. 7 by the same reference signs as those in FIG. 6 is omitted.

First, the information processing apparatus 4 sequentially executes the processes of S601 and S602. After S602, in S701, the candidate extraction unit 47 obtains information (hereinafter, referred to as nearby group information) on the attribute group (nearby group) located near the extraction target group in addition to the extraction target group information obtained in S602. In this case, determination of whether an attribute group corresponds to the nearby group or not may be performed as follows. For example, a barycentric position of each attribute group is calculated and such an attribute group that a distance between a barycentric position of this attribute group and the barycentric position of the extraction target group obtained in S602 is within a predetermined threshold is determined to correspond to the nearby group.

The nearby group is described in detail with reference to FIGS. 14A and 14B. FIGS. 14A and 14B are both conceptual diagrams illustrating an example of how multiple feature vectors are grouped into multiple attribute groups by using a clustering method based on machine learning, as in FIG. 11B. FIGS. 14A and 14B illustrate multiple attribute groups 1401, 1402, 1403, 1404, and 1405. Specifically, FIG. 14A illustrates the case where the single attribute group 1111 illustrated in FIG. 11B is divided and grouped into two attribute groups 1401 and 1402. Note that, in FIGS. 14A and 14B, positions indicated by a symbol of a black star illustrate barycentric positions of the respective corresponding attribute groups.

Figure 14A:
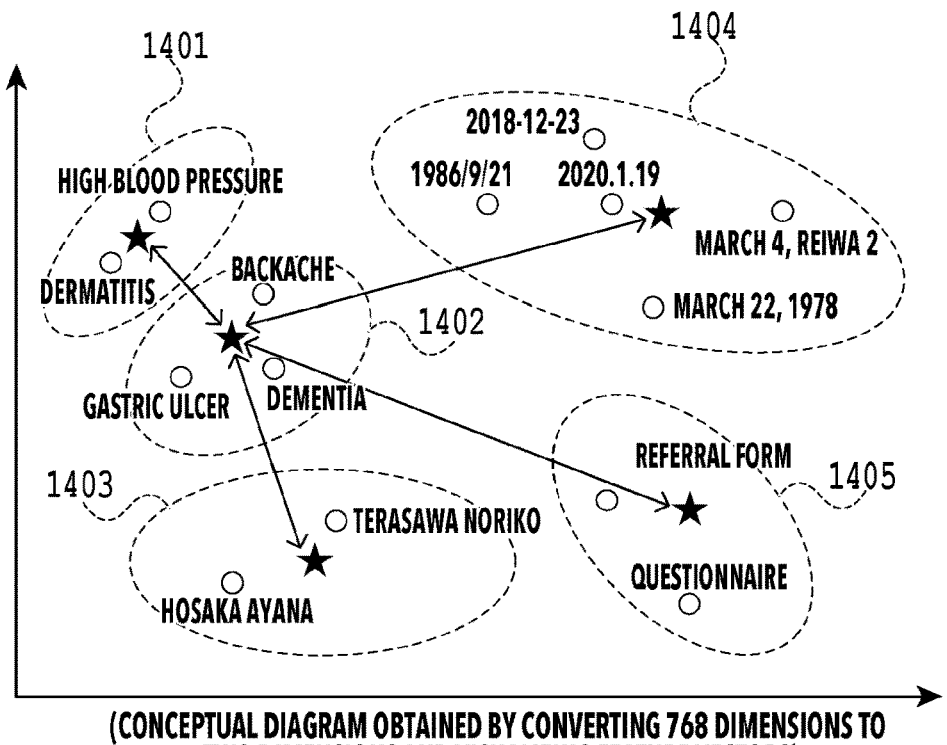
FIGS. 14A and 14B are conceptual diagrams illustrating an example of how multiple feature vectors are grouped into multiple attribute groups.
Figure 14B:
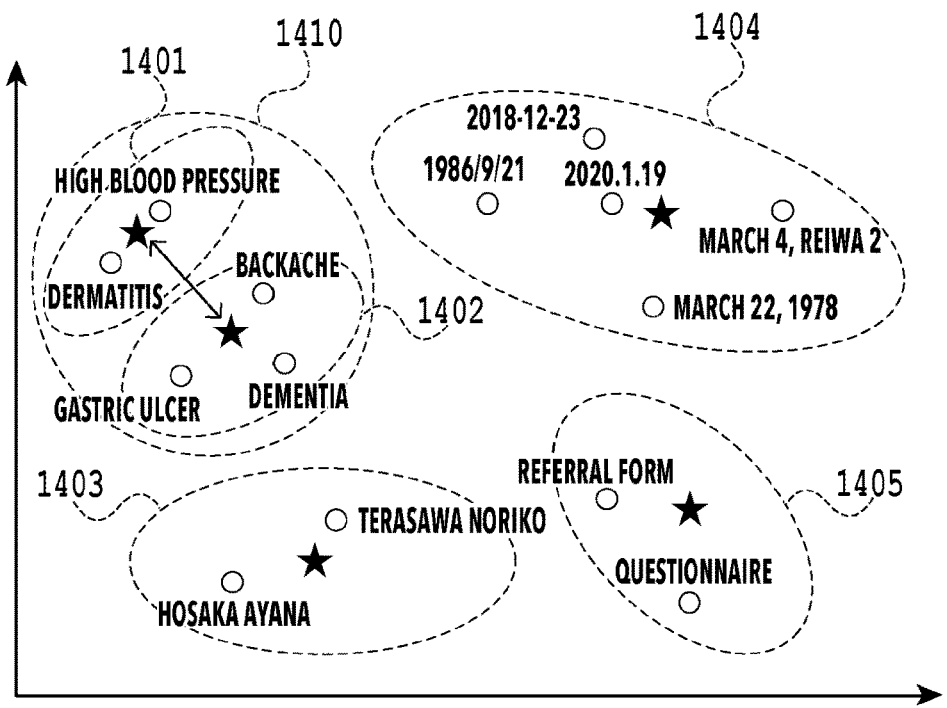

Description is given herein assuming that, in FIGS. 14A and 14B, the distance from the barycentric position of the attribute group 1402 to the barycentric position of the attribute group 1401 is within a range of the threshold. Moreover, description is given assuming that the distances from the barycentric position of each of the attribute group 1401 and the attribute group 1402 to the barycentric positions of the attribute groups 1403, 1404, and 1405 are all outside the range of the threshold. Specifically, the attribute group 1401 and the attribute group 1402 are the nearby groups of each other. For example, in the case where the extraction target group is the attribute group 1402, the candidate extraction unit 47 obtains, in addition to information on the attribute group 1402 that is the extraction target group, information on the attribute group 1401 located near the attribute group 1402 as the nearby group information. As a result, as illustrated in FIG. 14B, in the case where the attribute group 1401 or the attribute group 1402 is the extraction target group, the candidate extraction unit 47 can obtain information on an attribute group 1410 that is a combination of the attribute group 1401 and the attribute group 1402. Accordingly, for example, even in the case where granularity of segmentation into groups is too fine in the grouping by the clustering method, omission of extraction of the character string data not belonging to the same attribute group as the extraction target group can be reduced by taking the nearby group into consideration.

After S701, the information processing apparatus 4 sequentially executes the processes of S603 to S606. In the case where the candidate extraction unit 47 determines that the extraction target group and the identified attribute group are the same in S606, in S702, the candidate extraction unit 47 extracts the character string data selected in S605 as the data of candidate character string of a high-ranking candidate. After S702 or in the case where the candidate extraction unit 47 determines that the extraction target group and the identified attribute group are not the same in S606, in S703, the candidate extraction unit 47 determines whether the nearby group and the identified attribute group are the same or not. In the case where the candidate extraction unit 47 determines that the nearby group and the identified attribute group are the same in S703, in S704, the candidate extraction unit 47 extracts the character string data selected in S605 as the data of candidate character string of a low-ranking candidate. Note that, in the case where the candidate extraction unit 47 determines that extraction target group and the identified attribute group are not the same in S606 and that the nearby group and the identified attribute group are the same in S703, only the data of candidate character string of the low-ranking candidate is obtained. In this case, for example, the candidate extraction unit 47 may move the data of candidate character string of the low-ranking candidate up to that of the high-ranking candidate. After S703 or in the case where the candidate extraction unit 47 determines that the nearby group and the identified attribute group are not the same in S702, the information processing apparatus 4 executes the process of S608.

In the case where, in S608, the candidate extraction unit 47 determines that not all of the one or more pieces of character string data obtained by the character string obtaining unit 43 have been selected in S605, the information processing apparatus 4 returns to the process of S605 and repeatedly executes S605 to S606. Note that, in this case, in S605, the candidate extraction unit 47 selects character string data that has not been selected yet from among the one or more pieces of character string data obtained by the character string obtaining unit 43 in S603. In the case where, in S608, the candidate extraction unit 47 determines that all of the one or more pieces of character string data obtained by the character string obtaining unit 43 have been selected in S605, in S609, the candidate output unit 48 outputs the data of candidate character strings as an extraction result. Specifically, for example, the candidate output unit 48 generates a display image to be included in a screen for checking the extraction result, and outputs and displays the display image on a display device. To be more specific, for example, in the case where the candidate output unit 48 generates the display image to be included in the screen for checking the extraction result, the candidate output unit 48 generates the display image such that the data of candidate character string of the high-ranking candidate is displayed at a higher rank than the data of candidate character string of the low-ranking candidate.

As described above, the information processing apparatus 4 according to the second embodiment can extract not only the character string data belonging to the same attribute group as the set extraction target group but also the character string data belonging to the same attribute group as the nearby group as the candidate character strings. Specifically, even in the case where the granularity of attribute groups grouped by the clustering method is too fine and the desired extraction target group cannot be designated, the information processing apparatus 4 can extract the character string data belonging to the same attribute group as the nearby group, as the data of candidate character strings. Accordingly, omission of extraction of the data of candidate character strings can be reduced also in this case.

Third Embodiment

An information processing system 1 according to a third embodiment (hereinafter, simply referred to as "information processing system 1") is described with reference to FIGS. 8, 9, 15A, 15B, 16A, and 16B. A configuration of the information processing system 1 includes the image input apparatus 2, the learning apparatus 3, and the information processing apparatus 4 like the configuration of the information processing system 1 according to the first embodiment illustrated as an example in FIG. 1. Moreover, the image input apparatus 2, the learning apparatus 3, and the information processing apparatus 4 are coupled to be capable of communicating with one another via the network 5.

The information processing apparatus 4 according to the first and second embodiments is an apparatus that uses only the linguistic features of the character strings obtained with the language model to extract the data of candidate character strings. Meanwhile, the information processing apparatus 4 according to the third embodiment (hereinafter, simply referred to as "information processing apparatus 4") is an apparatus that uses the linguistic features and image features of the character strings to raise a priority of data of candidate character string with a high similarity and preferentially extract it. The information processing apparatus 4 may reduce a priority of data of candidate character string with a low similarity and extract it. The image features are features such as relationships of co-occurrence and the like between a character string that is an item value and a character string of an item name or the like that appears in a vicinity of a character region of the item value in the document image 13. The image features are not limited to these relationships and may be relative arrangement information such as position coordinates indicating a position of the character string of the item value in the document image 13, size information indicating the absolute size of the character string of the item value, or the like.

The configuration of the information processing apparatus 4 includes an evaluation unit not illustrated in FIG. 2C-1 in addition to the configuration of the information processing apparatus 4 according to the first embodiment illustrated as an example in FIG. 2C-1. Specifically, the information processing apparatus 4 includes the classifier obtaining unit 41, the processing image obtaining unit 42, the character string obtaining unit 43, the vector conversion unit 44, the attribute group identification unit 45, the extraction target setting unit 46, the candidate extraction unit 47, the candidate output unit 48, and the evaluation unit. Details of the evaluation unit are described later.

Moreover, processes of the units configured to function in the information processing apparatus 4 are performed by hardware such as an ASIC or FPGA incorporated in the information processing apparatus 4 or software using a memory such as a RAM and a processor such as a CPU. Specifically, for example, the information processing apparatus 4 is formed of the computer illustrated as an example in FIG. 2C-2. Note that, since the image input apparatus 2 according to the third embodiment (hereinafter, simply referred to as "image input apparatus 2") and the learning apparatus 3 according to the third embodiment (hereinafter, simply referred to as "learning apparatus 3") are the same as the image input apparatus 2 and the learning apparatus 3 according to the first or second embodiment, description thereof is omitted.

<Process of Extracting Candidate Character Strings>

Figure 8:
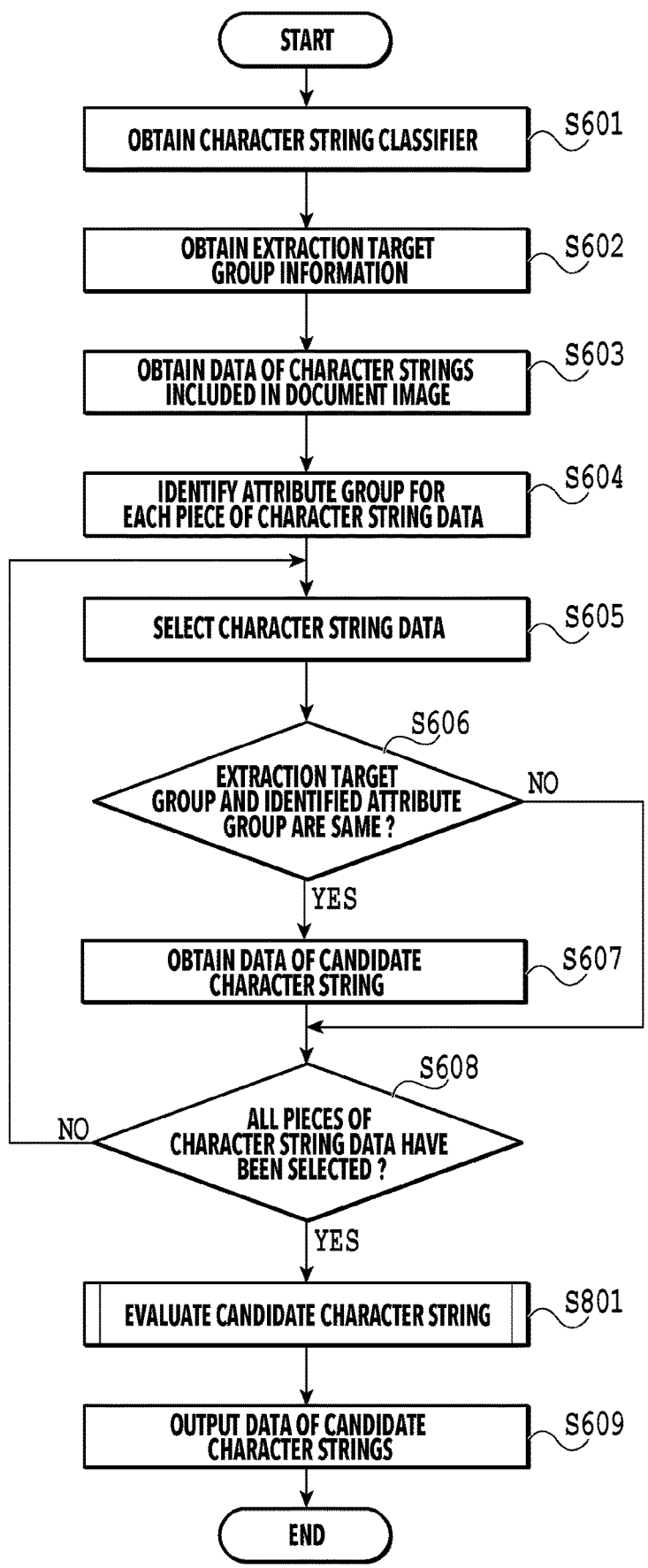
FIG. 8 is a flowchart illustrating an example of a flow of a process in the information processing apparatus according to a third embodiment.

A flow of a process in which the information processing apparatus 4 extracts the data of candidate character string corresponding to character strings included in the document image 13 in the processing sequence of (d) illustrated in FIG. 3B is described with reference FIG. 8. FIG. 8 is a flowchart illustrating an example of the flow of the process in which the information processing apparatus 4 according to the third embodiment extracts the data of candidate character strings corresponding to the character strings included in the document image 13. Note that, in the description of FIG. 8, reference sign "S" means step. Moreover, for example, a program configured to execute each step illustrated in FIG. 8 is stored in the ROM 262, the RAM 264, or the storage 265 of the information processing apparatus 4 and is executed by the CPU 261 of the information processing apparatus 4. Furthermore, description of the steps denoted in FIG. 8 by the same reference signs as those in the description using FIG. 6 is omitted.

First, the information processing apparatus 4 sequentially executes the processes of S601 to S608. In the case where, in S608, the candidate extraction unit 47 determines that all of the one or more pieces of character string data obtained by the character string obtaining unit 43 have been selected in S605, in S801, the evaluation unit evaluates validity of each piece of data of candidate character string extracted in S607, by using the image feature thereof. Note that details of the process in S801 are described later with reference to FIGS. 9A and 9B. After S801, the information processing apparatus 4 executes the process of S609. Specifically, in S609, the candidate output unit 48 outputs the data of candidate character strings determined to be adequate by the evaluation unit based on an evaluation result in S808, as an extraction result.

<Process of Evaluating Candidate Character Strings>

Figure 9A:
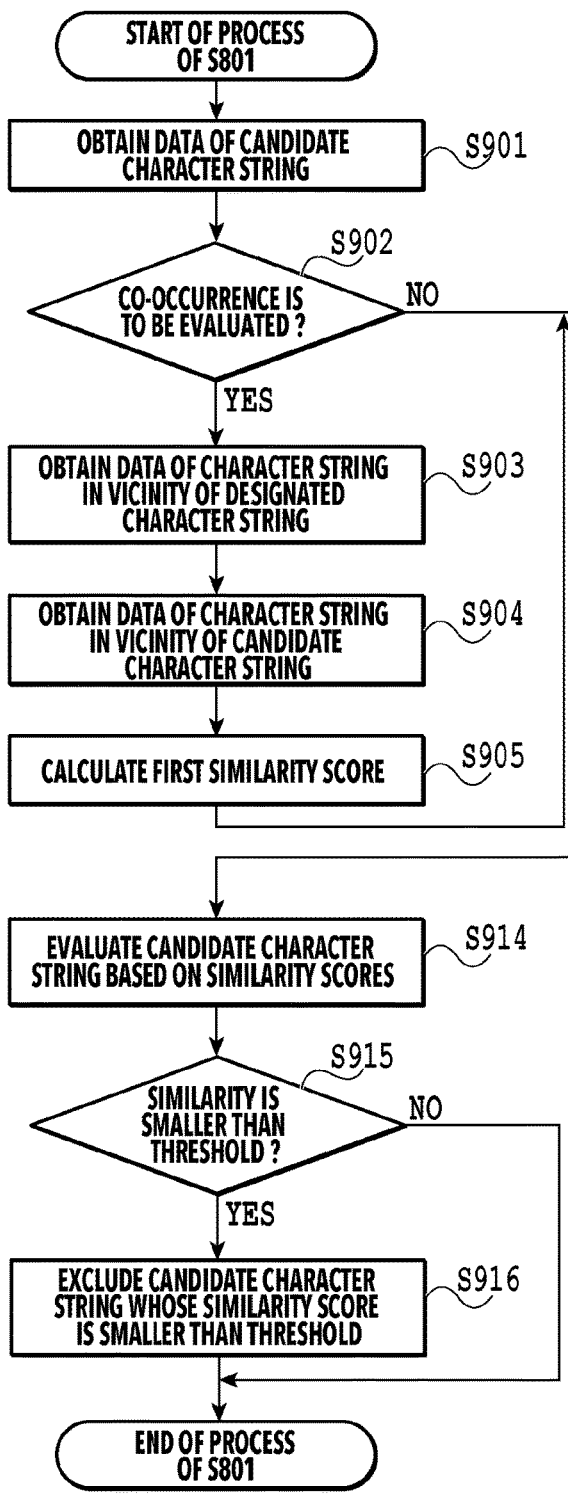
FIGS. 9A and 9B are flowcharts illustrating an example of a flow of a process in S801 illustrated in FIG. 8.
Figure 9B:
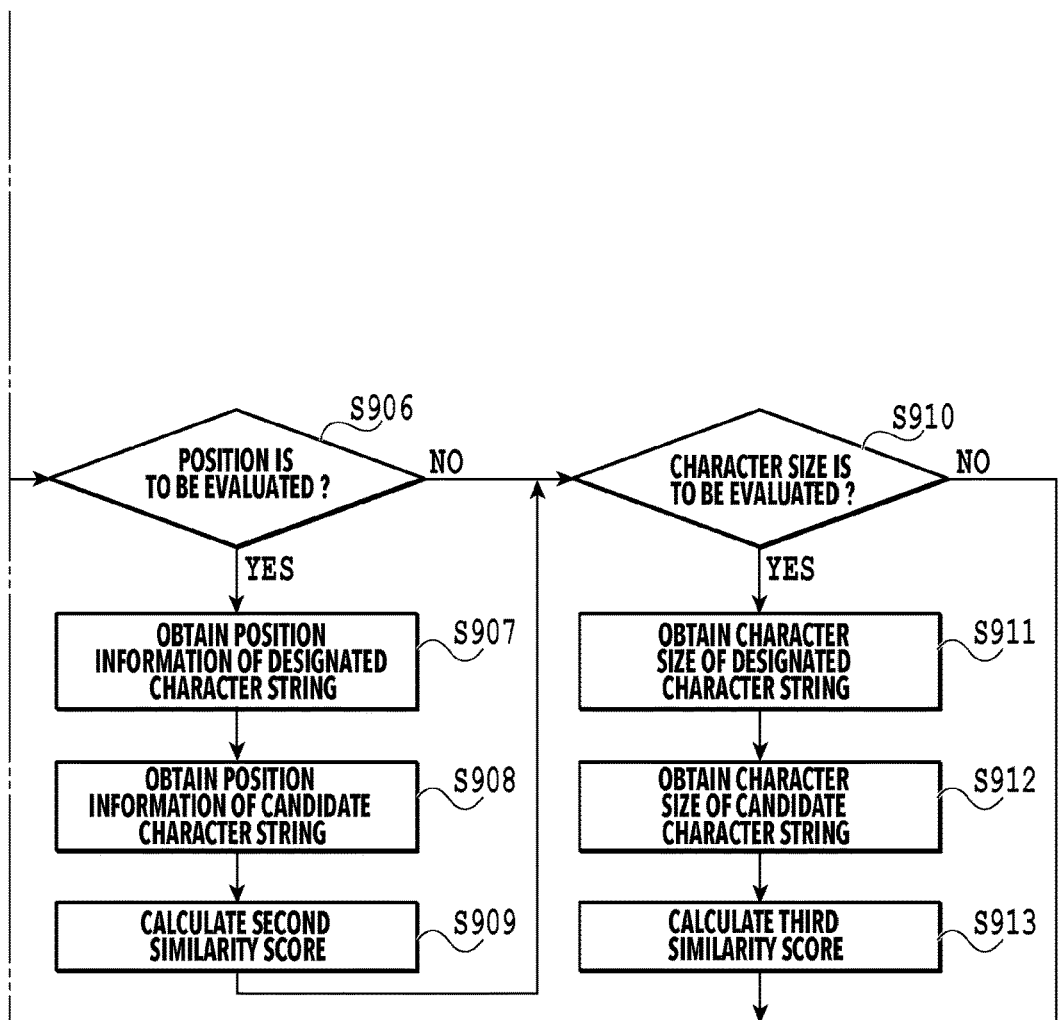

The process of S801 illustrated in FIG. 8 is described with reference to FIGS. 9A and 9B. FIGS. 9A and 9B are flowcharts illustrating an example of a flow of the process in S801 illustrated in FIG. 8. Note that, in the description of FIGS. 9A and 9B, reference sign "S" means step. Moreover, for example, a program configured to execute each step illustrated in FIGS. 9A and 9B is stored in the ROM 262, the RAM 264, or the storage 265 of the information processing apparatus 4 and is executed by the CPU 261 of the information processing apparatus 4. First, in S901, the evaluation unit obtains a piece of data of candidate character string extracted in S607, from the candidate extraction unit 47.

After S901, in S902, the evaluation unit determines whether to evaluate relationships of co-occurrence and the like between the data of candidate character string obtained in S901 and data of a character string located in a vicinity of a character region corresponding to this candidate character string in the document image 13. Setting relating to this evaluation may be setting defined by a flag that indicates necessity of this evaluation or the like and may be setting present in an initial state or set or changed by the user in S306, S310, or the like illustrated in FIG. 3A or 3B. In the case where the evaluation unit determines to evaluate the relationships between the pieces of character string data in S902, the evaluation unit sequentially executes processes of S903 to S905. In the case where the evaluation unit determines not to evaluate the relationships between the pieces of character string data in S902, the evaluation unit executes a process of S906. In the case where the evaluation unit determines to evaluate the relationships between the pieces of character string data in S902, in S903, the evaluation unit first obtains data of a character string located in a vicinity of a character region corresponding to the character string designated by the user in the document image 13 corresponding to the extraction target document.

Figure 15A:
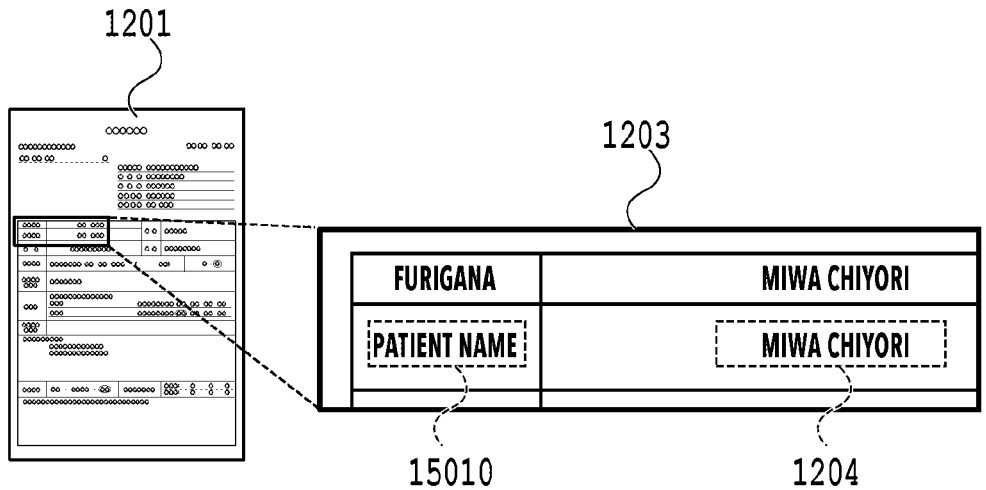
FIGS. 15A and 15B are explanatory diagrams for explaining an example of character strings located in a vicinity of a character string.
Figure 15B:
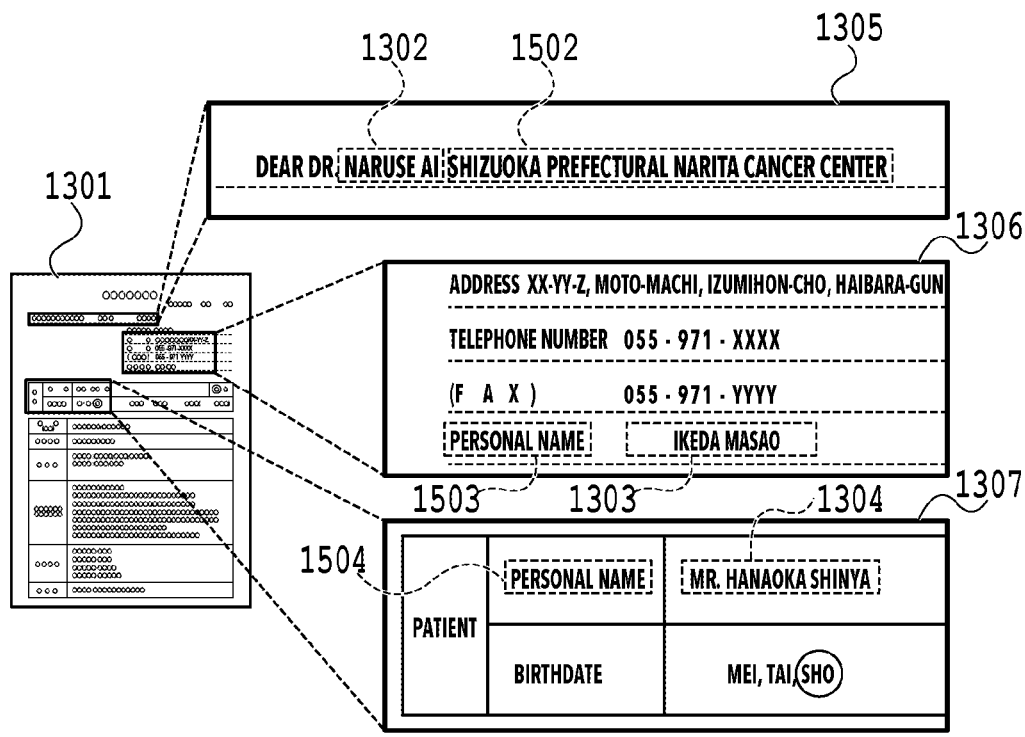

The character string located in the vicinity of the character region in the document image 13 is described with reference to FIGS. 15A and 15B. FIG. 15A is an explanatory diagram for explaining an example of the character string located in the vicinity of the character region of the designated character string in the document image 13 corresponding to the extraction target document illustrated in FIG. 12A. FIG. 15B is described later. As illustrated in FIG. 15A, the evaluation unit obtains data of a character string corresponding to a character region 1501 located in a vicinity of the character region 1204 corresponding to the item value. In this case, the character region 1501 is merely an example and the character string data to be obtained in S903 may be preset only to be the character string located in an area such as the left side or upper side of the character region of the item value designated by the user where the item name corresponding to the item value is highly-likely to appear. Moreover, the character string data to be obtained in S903 may be set to be, for example, multiple character strings such as a maximum of five character strings adjacent to the character region of the item value.

After S903, in S904, the evaluation unit obtains a character string located in a vicinity of a character region of the candidate character string in the document image 13 corresponding to the processing target document, by using a method similar to that in S903. FIG. 15B is an explanatory diagram for explaining an example of the character strings located in the vicinity of the character region of the candidate character string in the document image 13 corresponding to the processing target document illustrated in FIG. 13A. As illustrated in FIG. 15B, the evaluation unit obtains data of character strings corresponding respectively to character regions 1502, 1503, 1504, and 1505 located in vicinities of the respective character regions 1302, 1303, and 1304 of the candidate character strings. In this case, the character regions 1502, 1503, 1504, and 1505 are examples and the character region is not limited to these. For example, the character string to be obtained in S904 may be preset to be only the character string located in an area such as the left side or upper side of the character region of the item value where the item name for the item value is highly-likely to appear or may be set to be, for example, multiple character strings such as a maximum of five character strings adjacent to the character region of the item value.

After S904, in S905, the evaluation unit performs evaluation by comparing relationships between the character strings obtained in S903 and S904 and calculates a similarity score (hereinafter, referred to as "first similarity score") indicating a similarity between these character strings. A method of calculating the first similarity score may be, for example, a method in which the character string assumed to be the item name corresponding to the item value is converted to a feature vector by using a vectorizing method similar to that used for the item value and the maximum value of a cosine similarity of the converted feature vector is set as the first similarity score. After S905, the evaluation unit executes the process of S906.

In S906, the evaluation unit determines whether to evaluate arrangement information that indicates arrangement of the character region corresponding to the item value relative to an image region of the entire document image 13. Note that the arrangement information includes information such as position coordinates in a coordinate system in which a predetermined point in the image region of the entire document image 13 is set as an origin and a main scanning direction and a sub-scanning direction are set as an X axis and a Y axis, respectively. In this case, setting relating to this evaluation may be setting defined by a flag that indicates necessity of this evaluation or the like and may be setting preset in an initial state or set or changed by the user in S306, S310, or the like illustrated in FIG. 3A or 3B. In the case where the evaluation unit determines to evaluate the arrangement information in S906, the evaluation unit sequentially executes processes of S907 to S909. In the case where the evaluation unit determines not to evaluate the arrangement information in S906, the evaluation unit executes a process of S910.

In the case where the evaluation unit determines to evaluate the arrangement information in S906, in S907, the evaluation unit obtains the arrangement information of the character region corresponding to the character string designated by the user in the document image 13 corresponding to the extraction target document. Specifically, the evaluation unit obtains the arrangement information that indicates arrangement of this character region relative to the image region of the entire document image 13. To be more specific, for example, the evaluation unit calculates information indicating the position of this character region relative to an image size expressed by the width (for example, the length in the X axis direction) and the height (for example, the length in the Y axis direction) of the document image 13 as the arrangement information and obtains the arrangement information. After S907, in S908, the evaluation unit obtains the arrangement information of the candidate character string, included in the document image 13 corresponding to the processing target document, relative to the image region of this document image 13 by using a method similar to the process of S907.

Figure 16A:
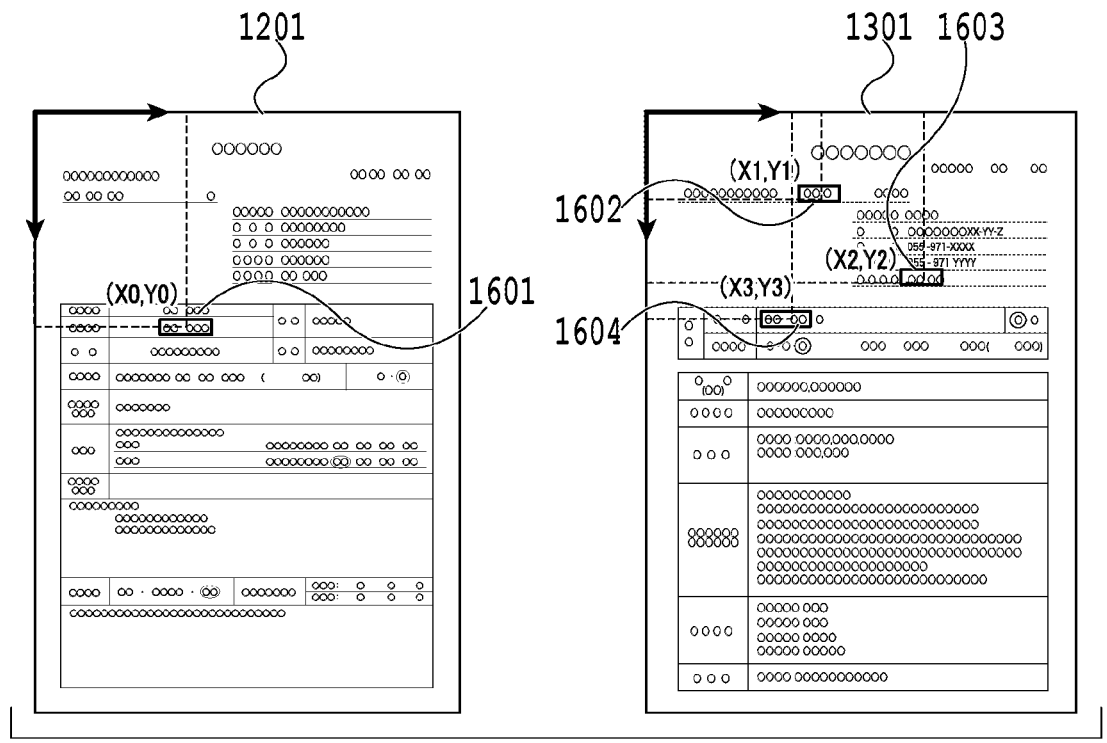
FIG. 16A is an explanatory diagram for explaining an example of arrangement of the character strings and FIG. 16B is an explanatory view for explaining an example of the sizes of the character regions.

Arrangement of a character region, corresponding to a character string included in a document image 13, relative to the image region of the entire document image 13 is described with reference to FIG. 16A. FIG. 16A is an explanatory diagram for explaining an example of arrangement of each of the character regions, corresponding to the character strings included in the document image 1201 corresponding to the extraction target document and the document image 1301 corresponding to the processing target document, relative to the image region of the corresponding document image 13. As illustrated in FIG. 16A, the evaluation unit obtains arrangement information (X0, Y0) of a character region, corresponding to a character string 1601 designated by the user in the document image 1201 corresponding to the extraction target document, relative to the image region of the entire document image 1201. Similarly, the evaluation unit obtains arrangement information (X1, Y1), (X2, Y2), and (X3, Y3) of character regions, corresponding to candidate character strings 1602, 1603, and 1604 included in the document image 1301 corresponding to the processing target document, relative to the image region of the entire document image 1301.

After S908, in S909, the evaluation unit performs evaluation of similarity by comparing the pieces of arrangement information obtained in S907 and S908 and calculates similarity scores (hereinafter, referred to as "second similarity scores). In this case, each second similarity score is calculated by, for example, the following method. First, the evaluation unit divides the arrangement information obtained in S907 by an image size of the document image 1201 in the X axis and the Y axis to calculate a first position coordinate vector. Next, the evaluation unit divides each piece of arrangement information obtained in S908 by an image size of the document image 1301 in the X axis and the Y axis to calculate a second position coordinate vector. Then, the evaluation unit calculates a cosine similarity between the first position coordinate vector and the second position coordinate vector as the second similarity score. After S909, the evaluation unit executes the process of S910.

In S910, the evaluation unit determines whether to evaluate information (hereinafter, referred to as "size information") indicating the absolute size of the character region corresponding to the item value. Note that the size information includes information indicating the width, that is the length in the X axis direction, of the character region and information indicating the height, that is the length in the Y axis direction, of the character region. In this case, setting relating to this evaluation may be setting defined by a flag that indicates necessity of this evaluation or the like and may be setting preset in an initial state or set or changed by the user in S306, S310, or the like illustrated in FIG. 3A or 3B. In the case where the evaluation unit determines to evaluate the size information in S910, the evaluation unit executes processes of S911 to S913. In the case where the evaluation unit determines not to evaluate the size information in S910, the evaluation unit executes a process of S914.

In the case where the evaluation unit determines to evaluate the size information in S910, in S911, the evaluation unit obtains the size information of the character region corresponding to the character string designated by the user in the document image 1201 corresponding to the extraction target document. Specifically, for example, the evaluation unit obtains the number of pixels in each of the main scanning direction (X axis direction) and the sub-scanning direction (Y axis direction) in a character region identified by using a well-known block selection technique. After S911, in S912, the evaluation unit obtains the size information of the character region corresponding to the candidate character string included in the document image 1201 corresponding to the processing target document by using a method similar to the process of S911.

Figure 16B:
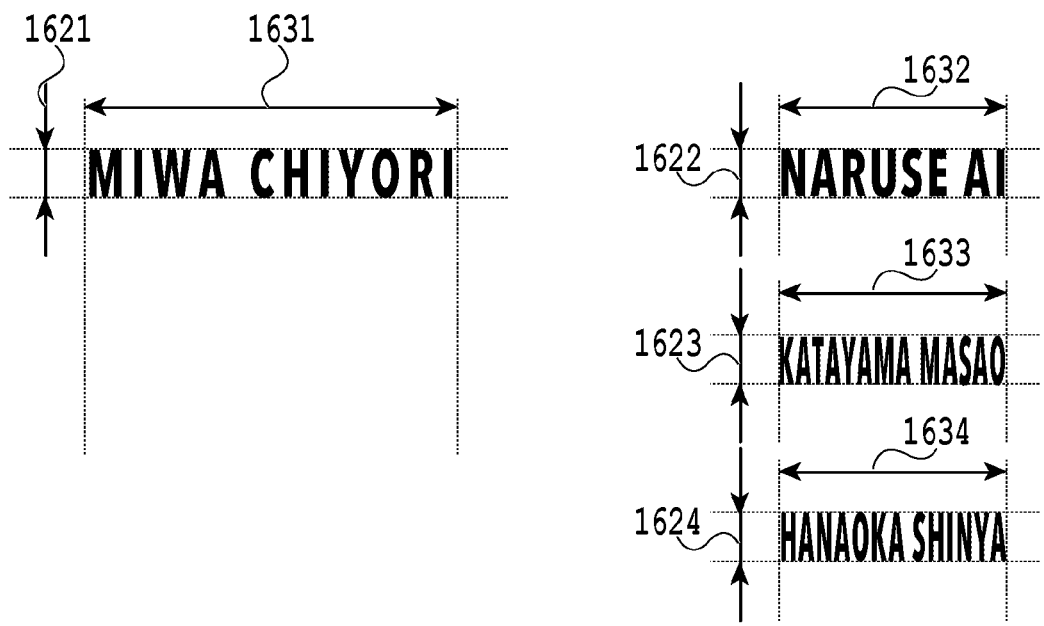

The size of the character region is described with reference to FIG. 16B. FIG. 16B is an explanatory diagram for explaining an example of the size of the character region obtained in S911 or S912. As illustrated in FIG. 16B, the evaluation unit obtains the number of pixels 1631 in the main scanning direction and the number of pixels 1621 in the sub-scanning direction in the character region of the character string 1601 designated by the user in the document image 1201 corresponding to the extraction target document. Similarly, the evaluation unit obtains the numbers of pixels 1632, 1633, and 1634 in the main scanning direction and the number of pixels 1622, 1623, and 1624 in the sub-scanning direction in the character regions corresponding to the candidate character strings 1602, 1603, and 1604 included in the document image 1301 corresponding to the processing target document.

After S912, in S913, the evaluation unit performs evaluation of similarity by comparing the size information obtained in S911 and each piece of size information obtained in S912 and calculates a similarity score (hereinafter, referred to as "third similarity score"). In this case, a method of calculating the third similarity score may be, for example, a method of calculating a value defined by a function to be negatively correlated such that the value takes 1 in the case where the sizes of the character strings match and becomes closer to 0 as a difference between the sizes of the character strings increases. After S913, the evaluation unit executes the process of S914.

In S914, the evaluation unit evaluates validity of each candidate character string by using at least one of the first, second, and third similarity scores calculated in S905, S909, and S913. Description is given below assuming that the evaluation unit calculates the first, second, and third similarity scores and evaluates the validity of the candidate character string by using all of the first, second, and third similarity scores. In this case, the first, second, and third similarity scores are evaluation values calculated based on measures varying from one another. Accordingly, the evaluation unit may calculate a total value (=coefficient 1×first similarity score+coefficient 2×second similarity score+coefficient 3×third similarity score) in which each similarity score is multiplied by a corresponding weighting coefficient, and evaluate the similarity by using this total value.

After S914, in S915, the evaluation unit determines whether the similarity corresponding to each candidate character string is smaller than a predetermined threshold or not. In the case where the evaluation unit determines that the similarity is smaller than the threshold in S915, in S916, the evaluation unit excludes the candidate character string determined to have a similarity smaller than the threshold, from the candidate character strings extracted in S607. The evaluation unit may perform setting of reducing the priority order of the candidate character string determined to have a similarity smaller than the threshold. After S916 or in the case where the evaluation unit determines that the similarity is not smaller than the threshold in S915, the evaluation unit terminates the processes of the flowchart illustrated in FIGS. 9A and 9B.

As described above, even in the case where narrowing down of the candidate character strings is difficult by using only the linguistic features, the information processing apparatus 4 according to the third embodiment can use a combination of the linguistic features and the image features to narrow down the candidate character strings such that results with high similarities are prioritized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to extract character string data desired by the user from an image of a document having a layout different from a fixed-form document having a predetermined layout, as a candidate of an item value corresponding to a predetermined item, also in the case where the item value is an item value of an item that are noted by irregular character strings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148491, filed Sep. 13, 2021 which is hereby incorporated by reference wherein in its entirety.

What is claimed is:

1. An information processing apparatus that extracts one or more candidate character strings to be a candidate of an item value corresponding to a predetermined item, from among a plurality of character strings included in a document image to be processed, the information processing apparatus comprising:
one or more hardware processors; and
one or more memories storing one or more programs configured to be executed by the one or more hardware processors, the one or more programs including instructions for:
obtaining information on an attribute group of a preset extraction target among a predetermined plurality of attribute groups;
identifying the attribute group to which each of the plurality of character strings belongs from among the plurality of attribute groups based on a feature vector corresponding to each of the plurality of character strings, and extracting the character string whose identified attribute group is the same as the attribute group of the extraction target from among the plurality of character strings as the candidate character string; and
outputting the extracted candidate character string,
wherein information indicating a nearby group is obtained, the nearby group being the attribute group located near the attribute group of the extraction target,
wherein the character string whose identified attribute group is the same as the nearby group is also extracted from among the plurality of character strings as the candidate character string in addition to the character string whose identified attribute group is same as the attribute group of the extraction target, and
wherein a barycentric position of each of the plurality of attribute groups is calculated and the attribute group that has a barycentric position within a range of a predetermined threshold from a barycentric position of the attribute group of the extraction target is set as the nearby group, from among the plurality of attribute groups.

2. The information processing apparatus according to claim 1, wherein
the one or more programs further include an instruction for converting data of each of the plurality of character strings to the feature vector, wherein
the attribute group to which each of the plurality of character strings belongs is identified based on the converted feature vector corresponding to each of the plurality of character strings.

3. The information processing apparatus according to claim 1, wherein the attribute group to which each of the plurality of character strings belongs is identified by using a classifier that classifies an inputted character string to one of the plurality of attribute groups.

4. The information processing apparatus according to claim 3, wherein the classifier is generated based on a learned model generated by machine learning in which character strings included in a plurality of document images different from the document image to be processed are used as data for learning.

5. The information processing apparatus according to claim 3, wherein the classifier is generated based on a learned model generated by machine learning in which character strings included in a plurality of document images are converted to the feature vectors, respectively, and the plurality of converted feature vectors are used as data for learning.

6. The information processing apparatus according to claim 1, wherein
the one or more programs further include an instruction for setting the attribute group of the extraction target, wherein
based on the feature vector corresponding to a character string designated from among one or more second character strings included in a document image different from the document image to be processed, the attribute group to which the designated character string belongs is identified from among the plurality of attribute groups, and the identified attribute group to which the designated character string belongs is set as the attribute group of the extraction target, and
information indicating the set attribute group of the extraction target is obtained.

7. The information processing apparatus according to claim 6, wherein
the one or more programs further include an instruction for converting data of each of the character strings into the feature vector, wherein
the designated second character string among the one or more second character strings included in the document image used to set the attribute group of the extraction target is converted to the feature vector, and
the attribute group to which the designated character string belongs is identified based on the feature vector corresponding to the designated character string.

8. The information processing apparatus according to claim 6, wherein the attribute group to which the designated character string belongs is identified by using a classifier that classifies an inputted character string to one of the plurality of attribute groups.

9. The information processing apparatus according to claim 8, wherein the classifier is generated based on a learned model generated by machine learning in which character strings included in a plurality of document images different from the document image to be processed are used as data for learning.

10. The information processing apparatus according to claim 8, wherein the classifier is generated based on a learned model generated by machine learning in which character strings included in a plurality of document images are converted to the feature vectors, respectively, and the plurality of converted feature vectors are used as data for learning.

11. The information processing apparatus according to claim 6, wherein
the one or more programs further include an instruction for comparing an image feature of each of one or more of the extracted candidate character strings and an image feature of the designated character string and calculating a similarity between the character strings, wherein
a priority of the candidate character string whose similarity is high is raised, and the candidate character string with a high priority among the one or more extracted candidate character strings is preferentially outputted.

12. The information processing apparatus according to claim 11, wherein the priority of the candidate character string whose similarity is low is reduced.

13. The information processing apparatus according to claim 11, wherein
information indicating a first relationship between each of the one or more extracted candidate character strings and the character string located in a vicinity of the candidate character string in the document image to be processed among the plurality of character strings is obtained,
information indicating a second relationship between the designated character string and the character string located in a vicinity of the designated character string in the document image different from the document image to be processed among the character strings included in the document image different from the document image to be processed is obtained,
for each of the one or more candidate character strings, the first relationship and the second relationship are compared and a similarity between the character strings is calculated as a first similarity, and
the priority of each of the one or more candidate character strings is changed based on the first similarity.

14. The information processing apparatus according to claim 11, wherein
information indicating a position of each of the one or more extracted candidate character strings in the document image to be processed is obtained,
information indicating a position of the designated character string in the document image different from the document image to be processed is obtained,
for each of the one or more candidate character strings, the position of the candidate character string and the position of the designated second character string are compared and a similarity between the character strings is calculated as a second similarity, and
the priority of each of the one or more candidate character strings is changed based on the second similarity.

15. The information processing apparatus according to claim 11, wherein
information on a size of each of the one or more extracted candidate character strings is obtained,
information indicating a size of the designated character string is obtained,
for each of the one or more candidate character strings, the size of the candidate character string and the size of the designated second character string are compared and a similarity between the character strings is calculated as a third similarity, and
the priority of each of the one or more candidate character strings is changed based on the third similarity.

16. A non-transitory computer readable storage medium storing a program for causing a computer to perform a control method of an information processing apparatus that extracts one or more candidate character strings to be a candidate of an item value corresponding to a predetermined item, from among a plurality of character strings included in a document image to be processed, the control method comprising the steps of:

obtaining information on an attribute group of a preset extraction target among a predetermined plurality of attribute groups;
identifying the attribute group to which each of the plurality of character strings belongs from among the plurality of attribute groups based on a feature vector corresponding to each of the plurality of character strings, and extracting the character string whose identified attribute group is the same as the attribute group of the extraction target from among the plurality of character strings as the candidate character string; and
outputting the extracted candidate character string,
wherein information indicating a nearby group is obtained, the nearby group being the attribute group located near the attribute group of the extraction target,
wherein the character string whose identified attribute group is the same as the nearby group is also extracted from among the plurality of character strings as the candidate character string in addition to the character string whose identified attribute group is same as the attribute group of the extraction target, and
wherein a barycentric position of each of the plurality of attribute groups is calculated and the attribute group that has a barycentric position within a range of a predetermined threshold from a barycentric position of the attribute group of the extraction target is set as the nearby group, from among the plurality of attribute groups.

17. An information processing method of extracting one or more candidate character strings to be a candidate of an item value corresponding to a predetermined item, from among a plurality of character strings included in a document image to be processed, the information processing method comprising the steps of:
obtaining information on an attribute group of a preset extraction target among a predetermined plurality of attribute groups;
identifying the attribute group to which each of the plurality of character strings belongs from among the plurality of attribute groups based on a feature vector corresponding to each of the plurality of character strings, and extracting the character string whose identified attribute group is the same as the attribute group of the extraction target from among the plurality of character strings as the candidate character string; and
outputting the extracted candidate character string,
wherein information indicating a nearby group is obtained, the nearby group being the attribute group located near the attribute group of the extraction target,
wherein the character string whose identified attribute group is the same as the nearby group is also extracted from among the plurality of character strings as the candidate character string in addition to the character string whose identified attribute group is same as the attribute group of the extraction target, and
wherein a barycentric position of each of the plurality of attribute groups is calculated and the attribute group that has a barycentric position within a range of a predetermined threshold from a barycentric position of the attribute group of the extraction target is set as the nearby group, from among the plurality of attribute groups.

* * * * *